United States Patent [19]

Konishi et al.

[11] Patent Number: 5,253,008
[45] Date of Patent: Oct. 12, 1993

[54] CAMERA

[75] Inventors: Kazuki Konishi, Hino; Akihiko Nagano, Kawasaki; Tokuichi Tsunekawa, Yokohama, all of Japan

[73] Assignee: Canon Kabushiki Kaisha, Tokyo, Japan

[21] Appl. No.: 958,482

[22] Filed: Oct. 8, 1992

Related U.S. Application Data

[63] Continuation of Ser. No. 584,896, Sep. 19, 1990, abandoned.

[30] Foreign Application Priority Data

Sep. 22, 1989 [JP] Japan ............ 1-247335
Sep. 22, 1989 [JP] Japan ............ 1-247575
Sep. 22, 1989 [JP] Japan ............ 1-247576

[51] Int. Cl.⁵ .............. G03B 13/02; G03B 13/36; G03B 7/08
[52] U.S. Cl. .................. 354/402; 354/432; 354/219
[58] Field of Search ........ 354/429, 431, 432, 433, 354/400, 402, 403, 404, 409, 465, 474, 471, 466, 195.1, 199, 200, 201, 219, 289.1, 289.12, 62

[56] References Cited

U.S. PATENT DOCUMENTS

| | | | |
|---|---|---|---|
| 4,047,187 | 9/1977 | Mashimo et al. | 354/402 X |
| 4,075,640 | 2/1978 | Ueda et al. | 354/432 |
| 4,574,314 | 3/1986 | Weinblatt | 354/400 X |
| 4,836,670 | 6/1989 | Hutchinson | 354/62 X |
| 4,982,217 | 1/1991 | Aihara | 354/400 |
| 5,036,347 | 7/1991 | Tsunekawa et al. | 354/400 |

FOREIGN PATENT DOCUMENTS 1-274736  11/1989  Japan.

Primary Examiner—W. B. Perkey
Attorney, Agent, or Firm—Robin, Blecker, Daley & Driscoll

[57] ABSTRACT

A camera comprising a gazing line detection device for obtaining the gazing point by detecting the movement of the gazing line of a user so that a proper photometry range is automatically set by selecting a specific method from a plurality of photometry methods in accordance with the distribution of the gazing points thus obtained.

26 Claims, 18 Drawing Sheets

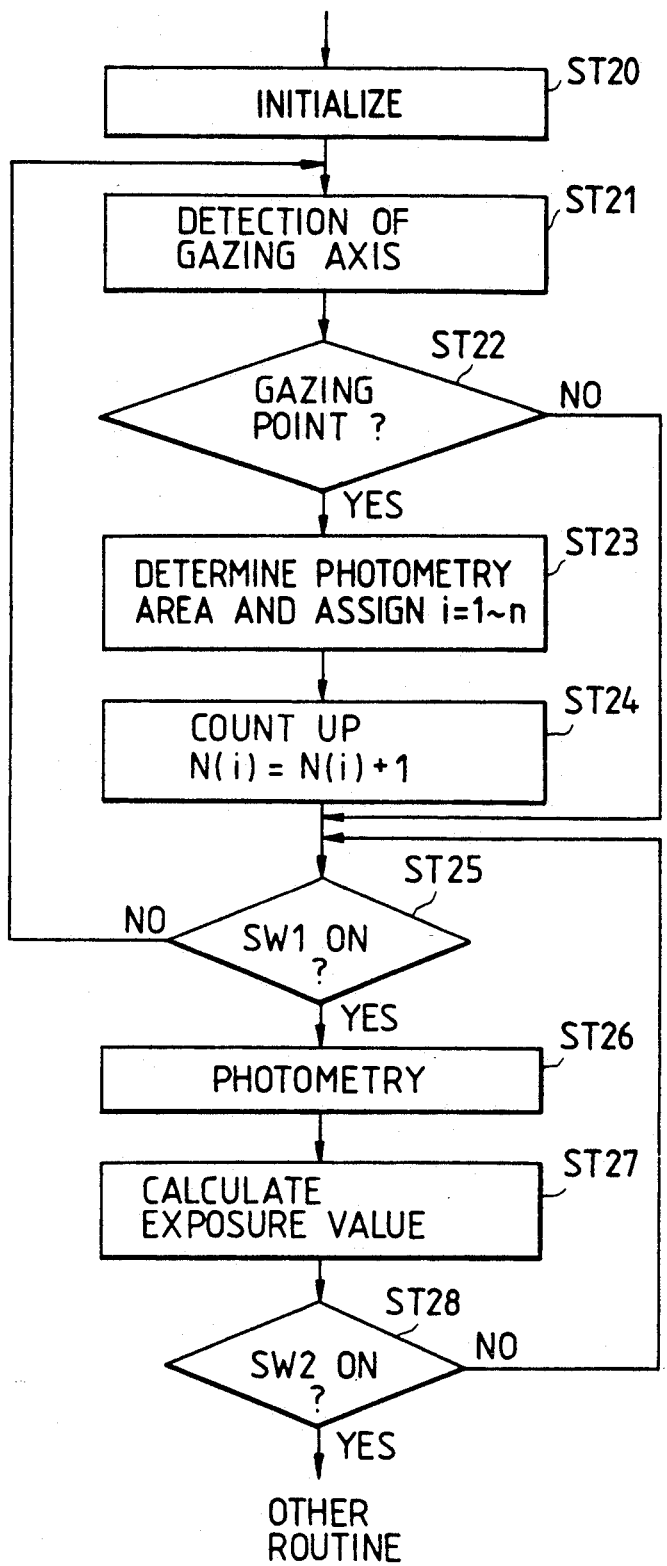

FIG. 6A
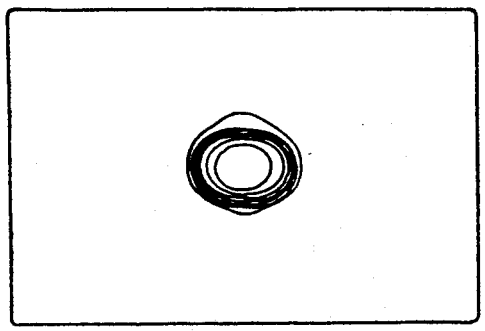
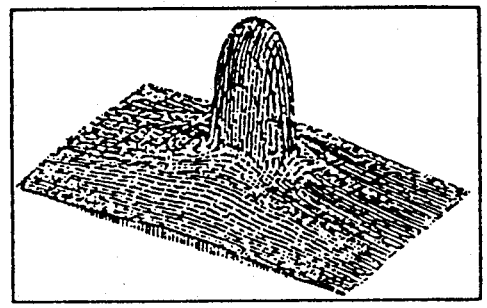
FIG. 6B
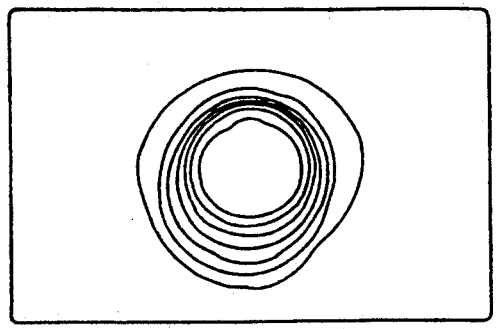
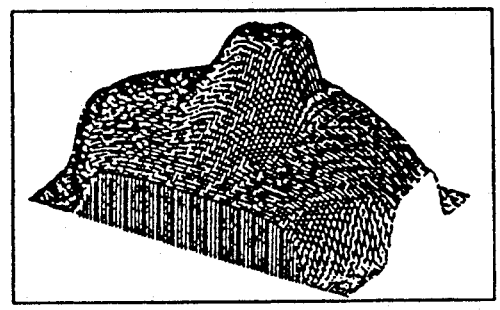
FIG. 6C
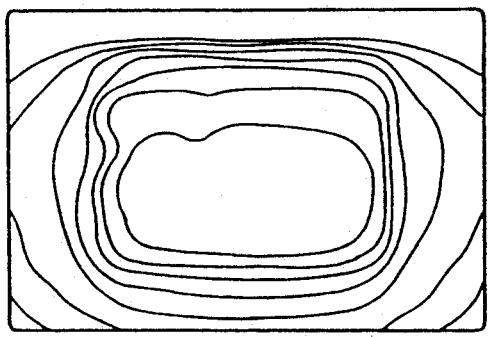
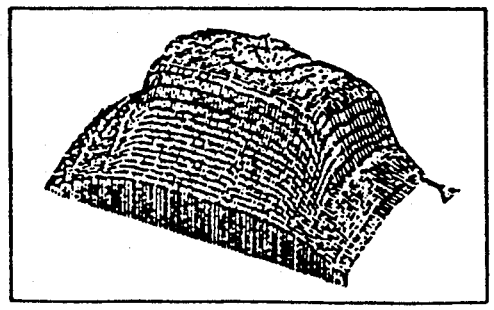

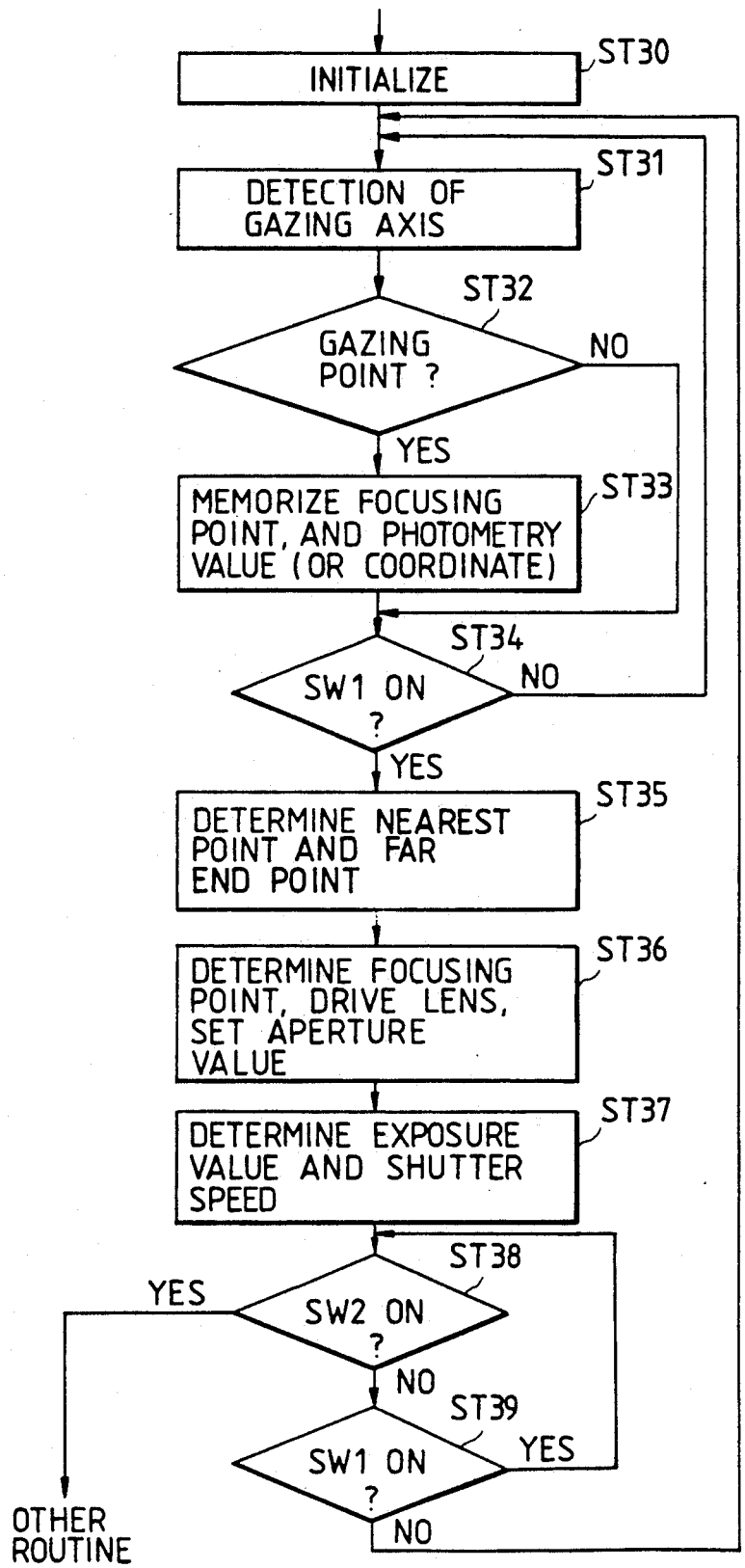

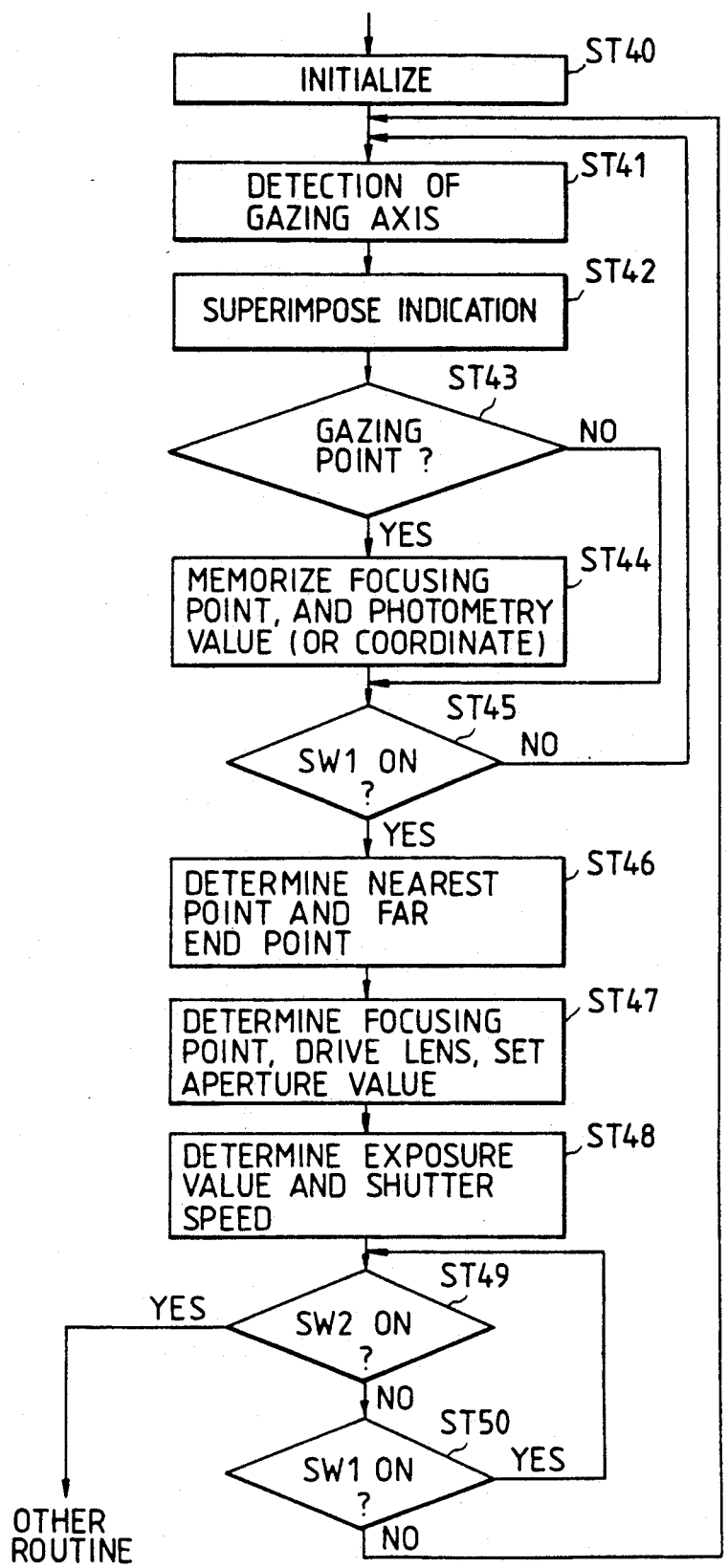

CAMERA

This is a continuation application under 37 CFR 1.62 of prior application Ser. No. 584,896, filed Sep. 19, 1990, now abandoned.

BACKGROUND OF THE INVENTION

1. Field of the Invention

The present invention relates to a camera having means for detecting the position of a gazing line.

2. Related Background Art

Hitherto, there has been developed a variety of cameras in each of which the value of photometry to be used for controlling the exposure, can be obtained variably.

For example, there has been a structure arranged, as shown in FIGS. 6A, 6B and 6C, in such a manner that three different photometry areas are provided (spot photometry subjected to the central portion, partial photometry subjected to the central portion and mean photometry subjected to the central portion with weighting), from which a preferable area can be selected. The above-described photometry methods respectively have the following characteristics so that a user is able to select a method which is suitable to take a photograph of the subject.

(a) Central spot photometry subjected to the central portion: only about 2.7% of the central portion of the image plane is subjected to the photometry, the subjected area being an area smaller than that subjected to the partial photometry for the central portion. In particular, only a small portion of the main subject is photographed according to the above-described method. Therefore, the above-described method can be suitably employed to take a stage photograph, a contact photograph and a closeup photograph.

(b) Partial photometry subjected to the central portion: only the main subject is subjected to the photometry. It is efficient to take a backlighted portrait or the like. Only 13% of the central portion is subjected to the photometry.

(c) Mean photometry subjected to the central portion with weighting: an ordinary photometry method which is suitably used for substantially all of the ordinary photographing and in which the brightness of the entire surface of the frame is measured. The photometry sensitivity distribution is characterized as designated by contour lines shown in FIG. 6C. Light at the central portion is sensed strongest and light intensity is damped toward the outside. According to this method, the influence from the sky can be prevented.

Furthermore, a so-called evaluation photometry has been disclosed.

However, with the conventional camera, the user must select any of the above-described three photometry methods. Therefore, it is difficult to select the most suitable photometry method depending upon the determination of the state of the subject, the state of the light direction and the like.

Furthermore, in order to handle the photometry mode selection button for the purpose of changing the photometry method, the user must not keep the eyes on the finder as usual. Therefore, the framing must be performed again.

As described above, since the selection of the photometry method necessitates an expert knowledge, it is a complicated work to change the photometry method. As a result, a user usually tends to use only one photometry method. Therefore, the advantage, in that there is provided a multiplicity of photometry methods, cannot be enjoyed.

Hitherto, there have been disclosed a variety of cameras of the type provided with a focal point exposure control function, that is, so-called a depth mode for setting the position of the focal point and the exposure value at the time of the photography by using both information about the position of the focal point and information about the photometry value of one or more points.

The depth mode is a mode with which the range (the depth of field) in which, for example, the focusing can be established, is able to be set as desired by a user. Then, the depth mode will be described with reference to FIG. 13. In the case where the subjects (A) to (C) disposed, as shown in FIG. 13A, at different distances from camera C are desired to be focused, the subject (A) is placed in the ranging frame of the camera C and a release button is depressed halfway (a switch $SW_1$ is switched on). Then, the subject (C) is also placed in the ranging frame and the release button is similarly depressed halfway. As a result of the above-described operation, an M.P.U. (Micro-Processor Unit) in the camera stores information about the position of the focal point of each of the subjects (A) and (C). Furthermore, the position of the focal point between the nearest subject (A) and the farthest subject (C) with which an ideal width of the depth can be obtained is calculated. In addition, the aperture value with which the subjects (A) and (C) are placed in the depth of field is calculated. With the aperture value thus calculated, the shutter speed is obtained. In the case where only the subject (B) at the central portion is desired to be focused as shown in FIG. 13B, the subject (B) is placed in the ranging frame and the halfway depressing the release button is performed two times. As a result, a photograph having a reduced depth can be obtained in which only the subject (B) can be focused and the other subjects (A) and (C) become dim.

However, according to the above-described conventional structure, the point or the range which is desired to be focused must be set by the user by directing the ranging frame to the nearest point and the farthest point and the halfway depressing of the release button must be repeated two times. Therefore, the setting operation becomes too complicated for the user to be performed and takes too long a time.

Recently, the quantity of information to be inputted to recent cameras has been increased in accordance with the tendency of the cameras having a multi-function. With the conventional camera, a user operates the push button switch or a dial type switch so as to input information about, for example, the photometry and the range. In general, when the types of information are increased, the handling becomes too complicated.

There have been disclosed a variety of so-called multi-spot exposure control devices arranged in such a manner that a plurality of optional points on the surface to be observed (the surface to be focused), which are information necessary for the photographing, is subjected to photometry so as to obtain the photometry value of each of the plurality of points by a predetermined method so that the exposure is controlled by using the result of the calculation of the photometry value.

FIG. 20 is a schematic view which illustrates an essential portion of a camera having a conventional multispot exposure control device.

Referring to the drawing, the user selects a mode of spot-photometry for the central portion by a photometry mode selection button disposed in a camera grip portion. Then, the user aligns a spot photometry range mark disposed at the central portion of a finder (surface to be observed) with the region desired to be subjected to the photometry, and depresses a spot photometry button. Thus, the obtained spot photometry value is stored in storage so as to be used for controlling the exposure.

In the case where a plurality of points are desired to be subjected to the photometry in a weighted manner, the camera is moved so as to align the spot photometry range mark at the central portion of the finder with the plurality of subject regions, and the spot photometry button is successively depressed. Thus, for example, the weighted average values of the photometry values of the plurality of points are obtained whenever the spot photometry button is depressed, the weighted average values being then stored in storage. By using the weighted average value of the photometry values at the plurality of points thus stored, information about exposure necessary for the exposure control is obtained.

In the conventional multi-spot photometry device utilizing the photometry values at the plurality of points in the surface to be observed, the spot photometry can be performed in only one place at the central portion of the finder (surface to be observed). Therefore, the user must move the camera so as to align the spot photometry range mark with the subject region whenever an optional point is selected in the surface to be observed.

Therefore, the user must move the camera after determining the framing so as to obtain the photometry values at the plurality of points so as to store them in storage. Furthermore, the user must again move the camera to the original position. As a result, the user must perform too complicated a handling operation. That is, the framing must be again performed after the photometry operation and the camera must be moved whenever the above-described operation is performed. Furthermore, the camera with a tripod cannot be easily moved in general. Therefore, the multi-spot photometry function cannot be effectively enjoyed.

SUMMARY OF THE INVENTION

One aspect of this invention lies in a camera comprising a gazing line detection device for obtaining the gazing point by detecting the movement of the gazing line of a user so that a proper photometry range is automatically set by selecting a specific method from a plurality of photometry methods in accordance with the distribution of the gazing points thus obtained.

One aspect of this invention lies in a camera comprising a gazing line detection device so that the gazing point of a user is obtained and information about the position of the focal point and information about the photometry value at the gazing point thus obtained are used so as to set the position of the focal point and the exposure value at the time of the photographing operation, the camera being thereby capable of setting the focusing range as desired without a necessity of a complicated operation.

Another aspect of this invention lies in a camera arranged in such a manner that a gazing line detection device is provided so that the gazing line of a user is detected and the region to be subjected to the photometry in a weighted manner is selected by using information about the gazing line so as to obtain information about exposure in accordance with the photometry value thus obtained, the camera being thereby capable of easily and quickly obtaining information about exposure.

Other and further objects features and advantages of the invention will be appear more fully from the following description.

BRIEF DESCRIPTION OF THE DRAWINGS

FIGS. 4 and 5 are flow charts which respectively illustrate the operation of a second embodiment and that of a third embodiment of the present invention;

FIGS. 6A, 6B and 6C illustrate respective photometry methods;

FIG. 9 is a flow chart which illustrates the operation of the fourth embodiment;

FIGS. 10A and 10B are a block diagram and a flow chart according to a fifth embodiment of the present invention;

DETAILED DESCRIPTION OF THE PREFERRED EMBODIMENTS

Preferred embodiments of the present invention will now be described with reference to the drawings.

First Embodiment

Figure 3:
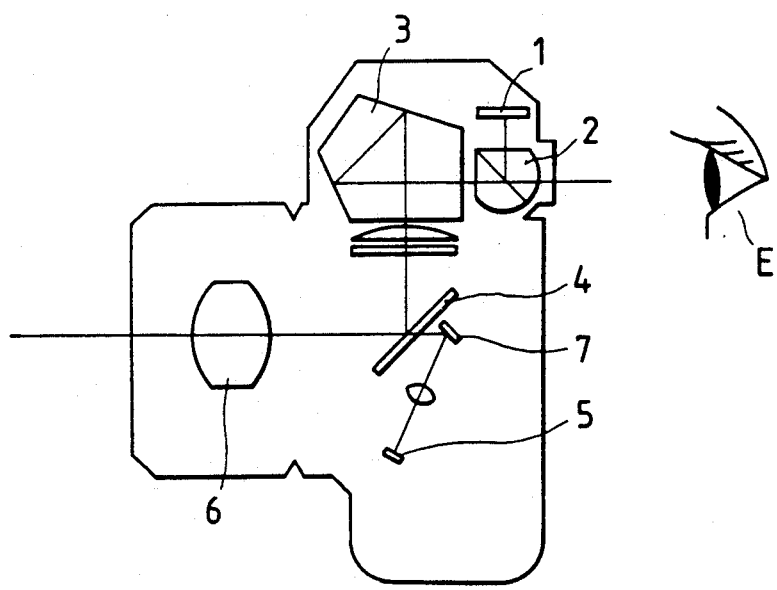
FIG. 3 is a schematic view which illustrates the camera according to the present invention.

FIG. 3 is a schematic view which illustrates a camera according to the present invention.

Light from a subject is made incident upon the eye E of a user via a main mirror 4, a penta-prism 3 and a dichroic mirror 2 after light has passed through an imaging lens 6. On the other hand, a portion of light from a subject which has passed through the imaging lens 6 passes through a main mirror 4 and reaches a photometry sensor 5 via a sub-mirror 7.

The dichroic mirror 2 reflects light from the eye E at an angle of, for example, 90° so as to image, via an imaging lens (omitted from the illustration), the reflected light on an image sensor 1 which acts to detect the gazing line. Although omitted from FIG. 1, light from an LED or the like, the level of the output of which is low, is applied to the eye E which gazes the ocular lens of the camera. Light reflected from the eye E is imaged on the image sensor 1 so that the position of the gazing line in the finder is detected by a gazing line position calculating device (omitted from the illustration) in accordance with information about the imaging position on the image sensor 1. The position of the gazing line can be detected by, for example, a method disclosed in Japanese Patent Laid-Open No. 61-172552 with which it is detected from the reflected image of the cornea and the central portion of the pupil.

According to this embodiment, the photometry sensor 5 is arranged to enable the photometry as shown in FIGS. 6A, 6B and 6C to be obtained.

Figure 1:
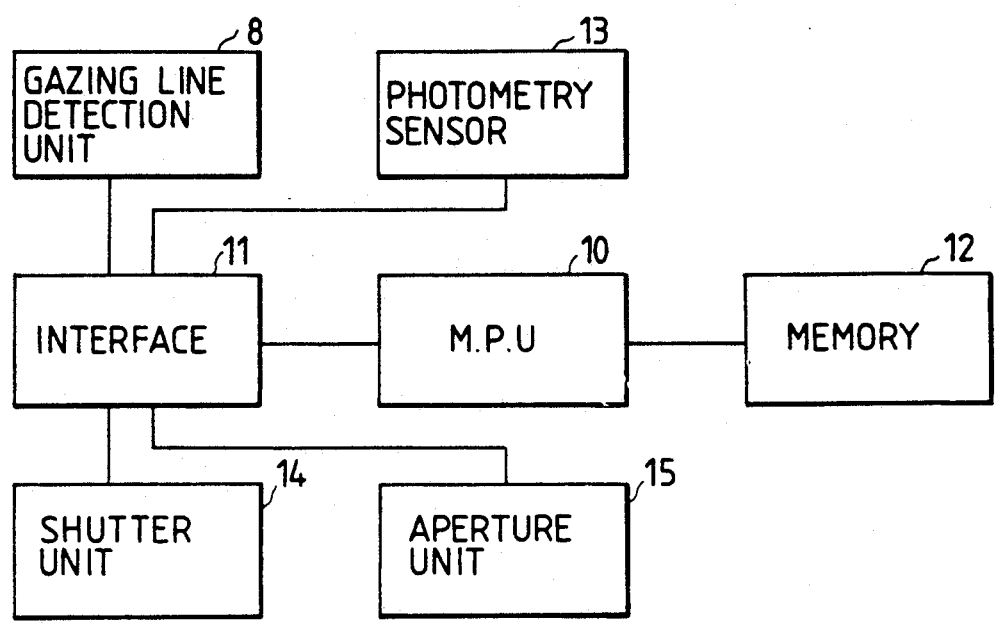
FIG. 1 is a block diagram which illustrates an automatic exposure control device of a camera according to an embodiment of the present invention.

FIG. 1 is a block diagram which illustrates a first embodiment of an automatic exposure control device of the camera according to the present invention.

Reference numeral 8 represents a gazing line detection unit comprising the image sensor 1 and the LED and 10 represents a microprocessor unit (M.P.U.) comprising the above-described gazing line position calculating device and circuits for calculating the TV value, the AV value and the like. The M.P.U. 10 receives, via an interface 11, information about the position of the gazing line supplied from the gazing line detection unit 8 and information about the photometry supplied from the photometry sensor 13. The M.P.U. 10 switches among a plurality of the photometry modes shown in FIGS. 6A, 6B and 6C in accordance with information about the position of the gazing line. The M.P.U. 10 determines the TV value and the AV value in accordance with the thus determined photometry mode (photometry area) so as to operate a shutter unit 14 and an aperture unit 15. Reference numeral 12 represents a memory for storing input information to be supplied to the M.P.U. 10 and the result of the calculation.

Furthermore, the M.P.U. 10 receives signals from a first switch ($SW_1$) and a second switch ($SW_2$) of a release switch (omitted from the illustration).

The operation of the first embodiment of the present invention will be described with reference to FIG. 2.

Figure 2:
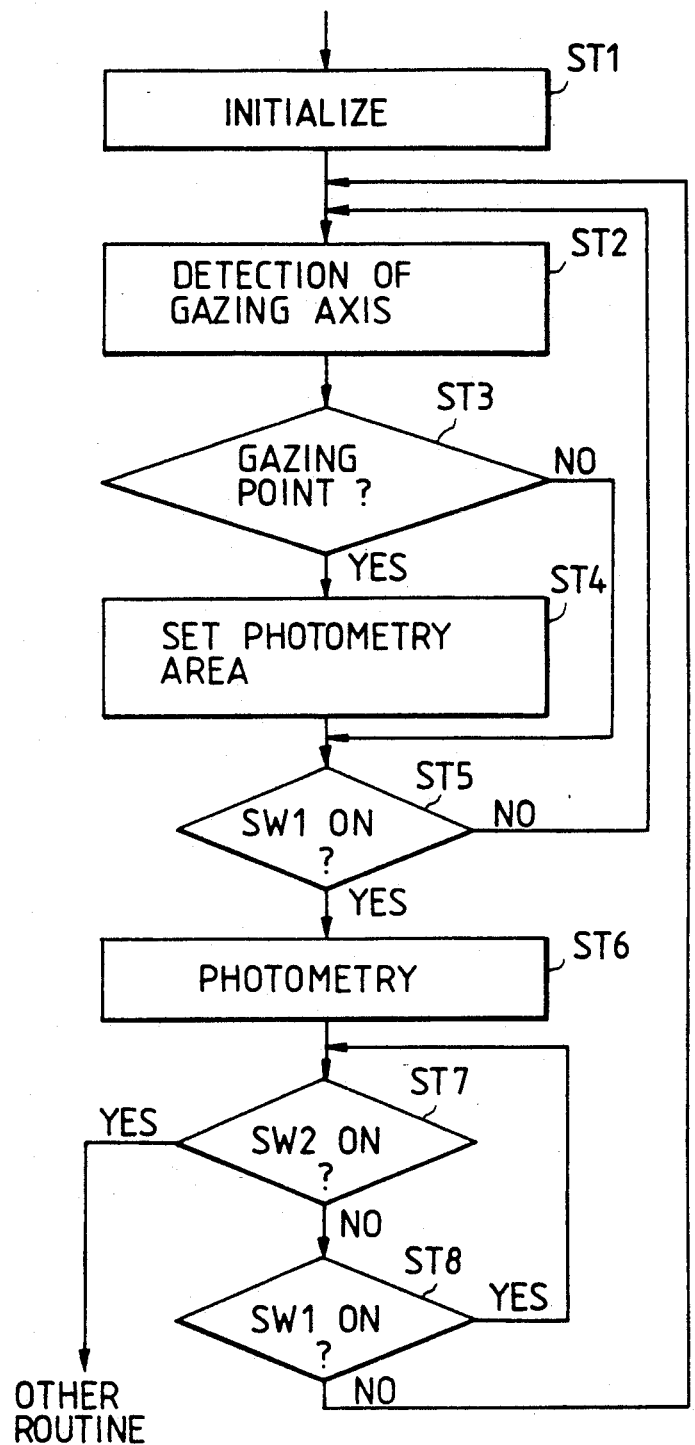
FIG. 2 is a flow chart which illustrates the operation of the same.

When the main switch of the camera is switched on or the photometry area automatic selection (switch) is called for, a routine of automatically selecting the photometry area shown in FIG. 2 is started. First, the initialization is performed for clearing the gazing point photometry area which has been instructed previously (step 1). Then, the gazing line of a user is detected (step 2) by the action of the M.P.U. 10 in such a manner that the image signal from the image sensor 1 is fetched at equal predetermined intervals. Then, it is determined whether or not the subject point is the gazing point (step 3). If it has been detected that the subject point is the gazing point, the present gazing point is added to the previous gazing points (stored in the memory 12) so as to calculate a proper photometry area capable of covering the above-described gazing points. The area thus calculated is set as a new photometry area (step 4). In the case where it is the first gazing point, the area capable of covering the first gazing point is set as the photometry area. The result of the above-described setting is stored in the memory 12. The above-described operation is continued until the release switch is depressed halfway (the switch $SW_1$ is switched on) (step 5). Since it is meaningless to continue the above-described operation for a long time, the number of the gazing points used for calculating the photometry area is limited to some recent gazing points. That is, the gazing point a certain time period before the photometry (the release switch is depressed halfway), that is, the gazing point immediately after the user gazes into the finder cannot be considered to be the point emphasized by the user. Therefore, with the above-described point excluded, the photometry area is calculated and set by using only the gazing points in a certain time from the point at which the release switch is depressed halfway (the switch $SW_1$ is switched on) and the photometry is thereby started. As a result, a problem, arising in that a photometry area for a wide area is undesirably set due to the use of the gazing points for a long time, can be overcome. When the release switch is depressed halfway, the photometry is performed in accordance with the photometry area which has been set at that time (step 6). When the release switch is depressed all the way (when the switch $SW_2$ is switched on) (step 7), a routine for controlling the exposure in accordance with the photometry value thus obtained is started.

Although the photometry value is arranged to be held during the continuation of the halfway depressing of the release switch (step 8) according to the flow chart shown in FIG. 2, another structure may be employed according to the present invention in which the photometry is always performed during the continuation of the halfway depressing of the release switch so as to always update the photometry value used for the exposure control.

Another method may be employed in which whether or not the gazing line is the gazing point is determined in accordance with the time (idle time) in which the gazing line is retained. That is, if the time in which the gazing line of a user is retained at a position for a certain length or longer, the above-described point is considered to be the gazing point.

Second and third embodiments of the present invention will be described in which the method of weighting each of the photometry values when the exposure value for use to control the exposure is obtained from a plurality of photometry values is changed in accordance with the state of distribution of the gazing points of the user. That is, the movement of the gazing line of the user is applied to a so-called evaluation photometry.

Second Embodiment

Figure 4:
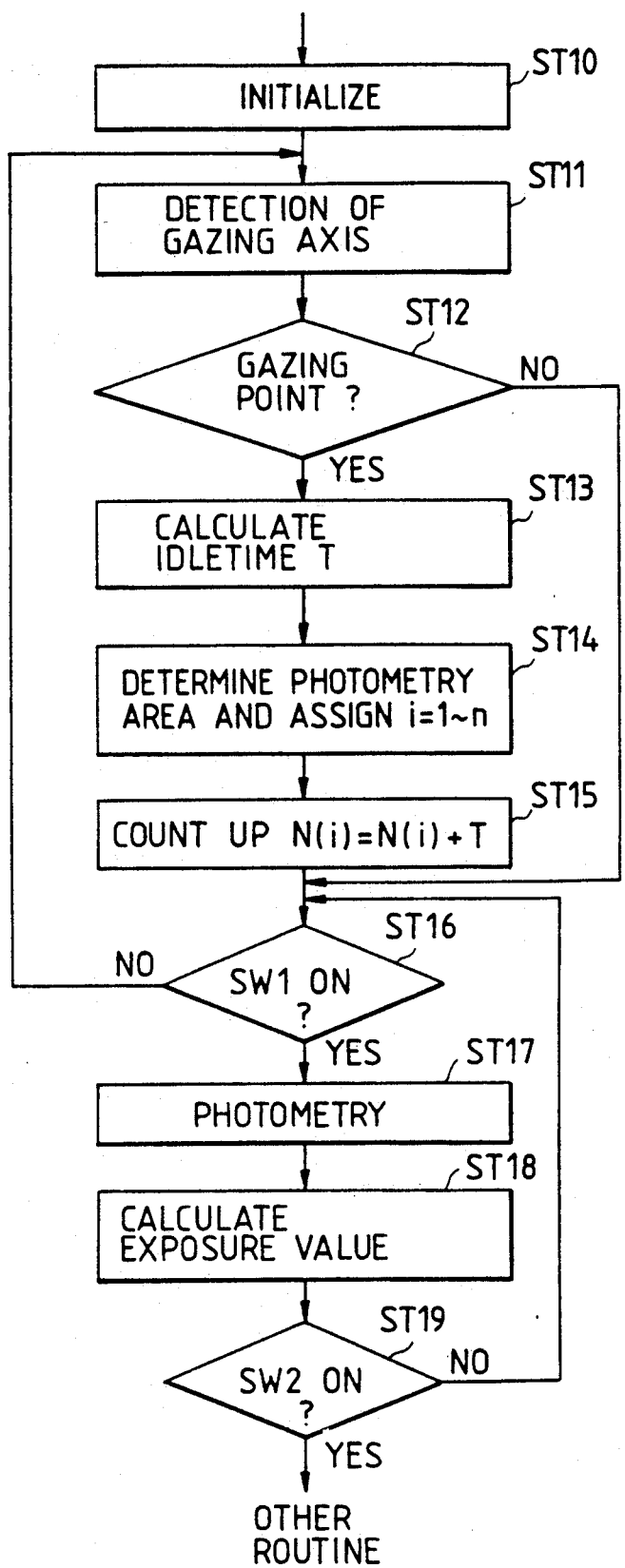

FIG. 4 is a flow chart for the second embodiment of the present invention.

When an illustrated routine in which the weighting of the evaluation photometry is automatically changed is started due to, for example, the switching on of the main switch of the camera, the initialization of a memory for use for counting the distribution frequency (time period) is first performed (step 10). Then, the gazing line of a user is detected (step 11) so as to determine whether or not the subject point is the gazing point (step 12). The above-described determination can be made, for example, in accordance with the length of the idle time at that point similarly to the first embodiment. If it has been determined that the subject point is the gazing point, idle time T at that point is calculated (step 13), and the area of the evaluation photometry in which the subject point is included is detected (step 14). Then, the count N (i) corresponding to that area is read and supplied to the memory 12 in which the obtained idle time T is added to the count N (i). The result of the addition is again stored in the memory 12 (step 15). The count thus stored is used to calculate the weighting coefficient for each of the photometry values for use in calculating the final exposure value, that is, a so-called weighting coefficient for the evaluation photometry is calculated. The above-described operation is continued until the release switch is depressed halfway (the switch $SW_1$ is switched on). Because of the same reason as that in the first embodiment, the gazing points for calculating the weighting coefficient for each of the photometry values at the time of calculating the final exposure value are limited to those in a predetermined time after the release switch has been depressed halfway. When the release switch is depressed halfway, the weighting coefficient is calculated from the counts which correspond to the photometry areas stored in the memory 12. The method of the calculation is exemplified by Equation (1) to be described later. Then, each of the divided photometry areas is subjected to the photometry (step 17) so that the final exposure value for controlling the exposure is obtained in accordance with the weighting coefficients thus calculated (step 18). When the release switch is depressed all the way (when the switch $SW_2$ has been switched on), a routine in which the exposure is controlled is started (step 19). According to the flow chart shown in FIG. 4, the photometry and the calculation are always performed during the continuation of the halfway depressing of the release switch and the exposure value for controlling the exposure is thereby always updated. However, another structure may be employed in which the exposure value obtained immediately after the release switch has been depressed halfway is held if the state where halfway depressing of the release switch is continued.

$$W(i) = \frac{N(i)}{\sum_{i=0}^{m} N(i)} \quad (1)$$

where
  m: the number of areas divided
  W (i) : weighting coefficient for area i
  N (i) : count corresponding to area i

Third Embodiment

The third embodiment of the present invention will be described. FIG. 5 illustrates a flow chart therefor.

Similarly to the second embodiment, when an illustrated routine in which the weighting of the evaluation photometry is automatically changed is started, the initialization of a memory 12 for use for counting the distribution frequency (numbers) is first performed (step 20). Then, the gazing line of a user is detected (step 21) so as to determine whether or not the subject point is the gazing point (step 22). The above-described determination can be made similarly to the first and the second embodiments. If it has been determined that the subject point is the gazing point, the area of the evaluation photometry in which the subject point is included is detected (step 23). Then, the count N (i) corresponding to that area is read and supplied to the memory 12 in which 1 is added to the count N (i) so as to be again stored in the memory 12 (step 24). The count thus stored is used to calculate the weighting coefficient for each of the photometry values for use in calculating the final exposure value, that is, a so-called weighting coefficient for the evaluation photometry is calculated. The above-described operation is continued until the release switch is depressed halfway (the switch $SW_1$ is switched on). Because of the same reason as that in the first and the second embodiments, the gazing points for calculating the weighting coefficient for each of the photometry values at the time of calculating the final exposure value are limited to those in a predetermined time after the release switch has been depressed halfway. When the release switch is depressed halfway, each of the divided photometry areas is subjected to the photometry (step 26) so that the final exposure value for controlling the exposure is obtained in accordance with the weighting coefficients thus calculated (step 27). When the release switch is depressed all the way (when the switch $SW_2$ has been switched on), the weighting coefficient is calculated similarly to the second embodiment and a routine in which the exposure is controlled is started (step 28). According to this embodiment, either the structure in which the photometry and the calculation are always performed during the continuation of the halfway depressing of the release switch and the exposure value for controlling the exposure is thereby always updated or the structure in which the first value is held may be selected since it is not the critical factor.

As described above, according to the first to the third embodiments, the exposure value can be made a proper value simply by a user's gazing of the desired subject through a finder. Therefore, the most suitable photometry method can be always selected in accordance with the state of distribution of the gazing points with a necessity of expert knowledge eliminated by:

(1) switching the photometry area; and
(2) changing the weighting coefficient for each of the photometry areas for the evaluation photometry.

Furthermore, the complicated operation experienced with the conventional camera can be eliamianted. Therefore, the most suitable photometry method can be quickly and accurately selected without too-complicated an operation. As a result, the automatic exposure control camera provided with a multiplicity of photometry methods is enabled to exhibit its advantages.

Fourth Embodiment

Figure 8:
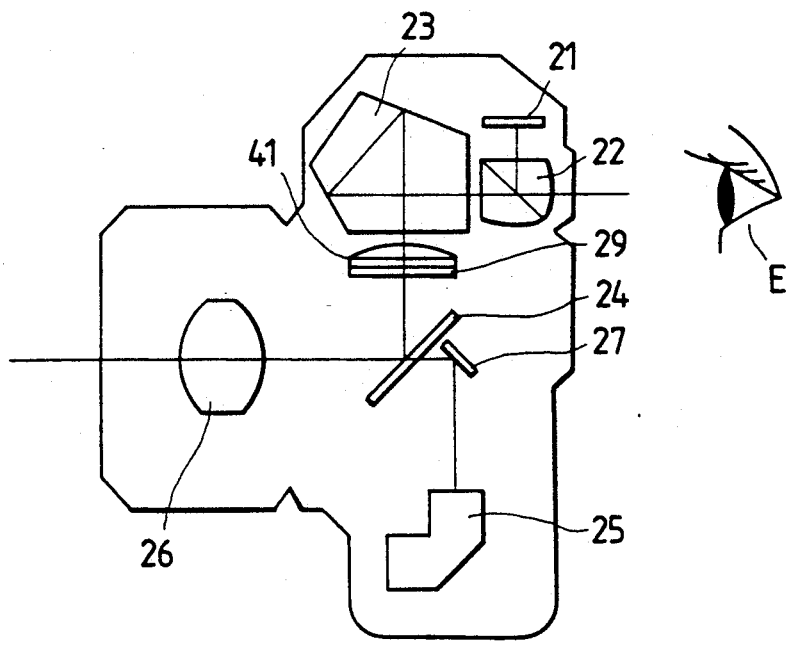
FIG. 8 is a schematic view which illustrates the camera according to the present invention.

FIG. 8 is a schematic view which illustrates the camera according to the present invention.

Light from a subject which has passed through an imaging lens 26 is made incident upon the eye E of a user via a main mirror 24, a penta-prism 23 and a dichroic mirror 22. On the other hand, a portion of light from a subject which has passed through the imaging lens 26 passes through a main mirror 24 and reaches a focusing unit 25 via a sub-mirror 27.

The dichroic mirror 22 reflects light from the eye E at an angle of, for example, 90° so as to image, via an imaging lens (omitted from illustration), the reflected light on an image sensor 21 which acts to detect the gazing line. Although omitted from FIG. 8, light from an LED or the like, the level of the output of which is low, is applied to the eye E which gazes into the ocular lens of the camera. Light reflected from the eye E is imaged on the image sensor 21 so that the position of the gazing line in the finder is detected by a gazing line position calculating device (omitted from the illustration) in accordance with information about the imaging position on the image sensor 21.

The image of the subject 5 passed through the imaging lens 26 is made incident upon the photometry sensor (omitted from the illustration) so that the photometry such as a photometry of an optional point or a mean photometry in the finder can be performed by a photometry calculating circuit or the like.

Figure 7:
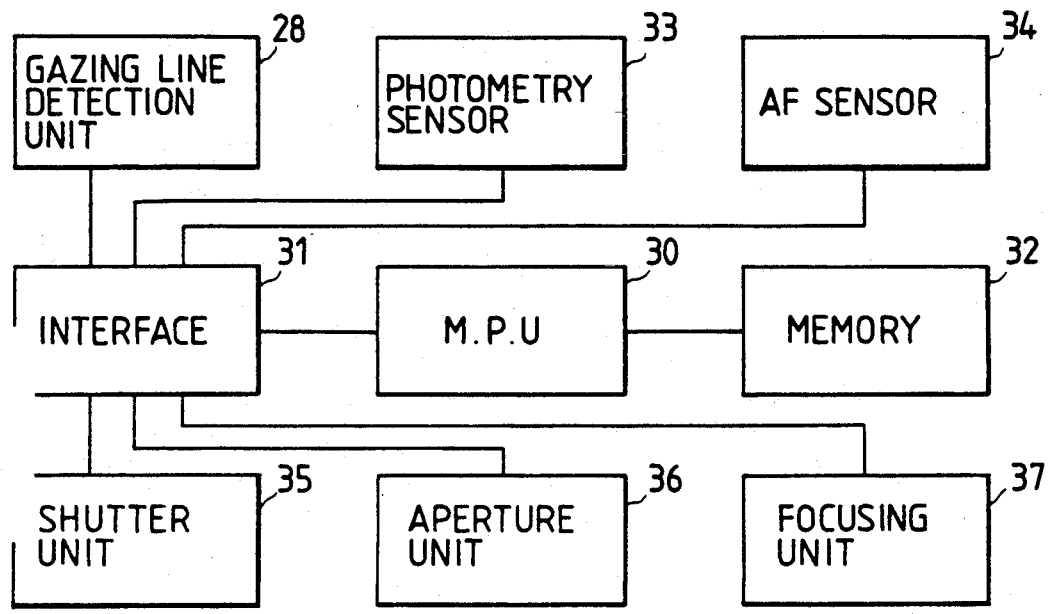
FIG. 7 is a block diagram which illustrates a photography control device of a camera according to a fourth embodiment of the present invention.

FIG. 7 is a block diagram which illustrates a fourth embodiment of a imaging control device according to the present invention.

Reference numeral 28 represents a gazing line detection unit comprising the image sensor 21 and the LED (omitted from the illustration). Reference numeral 10 represents a microprocessing unit (M.P.U.) comprising the gazing line position calculating circuits, the photometry calculating circuit and a range calculating circuit. Information obtained by the image sensor 21 of the gazing line detection unit 28 and information obtained by the photometric sensor 33 and that obtained by the range sensor (AF sensor) 34 are supplied to the M.P.U. 30 via an interface 31. Information items are calculated in the M.P.U. 30 acts, via the intervace 31, to operate a shutter unit 35, an aperture unit 36 and a focusing unit 37. Furthermore, the results of the calculations are stored in a memory 32.

The M.P.U. 30 receives a signal from the first switch (SW$_1$) and that from the second switch (SW$_2$) of the release switch (omitted from the illustration).

FIG. 9 is a flow chart which illustrates the action of the imaging control device of a camera according to the fourth embodiment of the present invention.

When the main switch of the camera is switched on or a mode (to be called an "automatic depth mode") for determining the aperture value and the shutter speed in accordance with the determined area (the depth of field) in which the focusing can be automatically performed is selected by a switch or the like, an illustrated routine for the automatic depth mode is started. First, an initialization for clearing the gazing points which have been previously calculated and information about the (final) position of the focal point is performed (step 30). Then, the gazing line of a user in the finder is detected (step 31). The above-described detection can be made by the M.P.U. 30 in such a manner that it fetches and calculates an image signal from the image sensor 21 of the gazing line detection unit 28. Then, it is determined whether or not the subject point is the gazing point (step 32). If it has been determined that the subject point is the gazing point, information about the position of the focal point, information about the photometry value or information about the gazing point (coordinate) is stored (step 33). The above-described operation is continued until the release switch is depressed halfway (the switch SW$_1$ is switched on). Since the too-long continuation of the above-described operation is meaningless, the number of the gazing points to be stored in the memory is limited to some recent points. That is, the gazing point a certain time period before the release switch is depressed halfway (the switch SW$_1$ is switched on), namely, the gazing point immediately after the user gazes into the finder, cannot be considered to be the point emphasized by the user. Therefore, with the above-described point excluded, information about the position of the focal point of only the gazing point in a certain time from the time at which the release switch is depressed halfway is stored in the memory 32. As a result, a problem arising from the use of data about the gazing point for too long a time in that a range from a substantially close distance to a substantially infinite distance is undesirably instructed as the desired focusing area can be overcome. Furthermore, another problem arising in that the photometry value of a wide area is always and undesirably subjected to the operation of obtaining the exposure value can be overcome. That is, a problem arising in that the desire of the user inputted as the gazing line becomes diffused and meaningless can be overcome. That is, when one or more subjects in the finder are gazed at by a user, the position of the focal point, the photometry value or the coordinate of the gazing point of each of the one or more subjects is stored in the memory. When the release switch is depressed halfway (switch SW$_1$ is switched on), the nearest point and the farthest point of the subject gazed at by the user are acknowledged by using information about the position of the focal point stored in the memory 12. Also information about the focal distance of the lens is used so as to calculate the position of the focal point between the above-described two points from which the width of the ideal depth can be obtained. Furthermore, the aperture value at which the above-described two points are included in the depth of field is calculated (step 35). Simultaneously, the lens is moved to the position of the focal point thus calculated (step 36).

Then, by using all of the stored photometry values or at the point corresponding to the gazing point stored, the photometry is performed so that the exposure value at the time of the release is obtained. In addition, the shutter speed is obtained from the exposure value thus obtained and the aperture value (step 37). The exposure value at the time of the release can be obtained by, for example, a method in which the weighted means is calculated by using the following equation:

$$Ev = \frac{\sum_{i=1}^{n} \alpha(i) I(i)}{\sum_{i=1}^{n} \alpha(i)}$$

where
  n : the number of the gazing points
  α (i) : the weighting coefficient for each point $0 \leq \alpha(i) \leq 1$ I (i) : the photometry value for each point When the release switch is depressed all the way (when the switch SW$_2$ is switched on) (step 38), a routine for performing the release action in accordance with the aperture value and the shutter speed thus calculated is started.

According to the flow chart shown in FIG. 9, the calculated values (the position of the focal point, the aperture value and the shutter speed) are held during the continuation of the halfway depressing of the release switch (the switch SW₁ is switched on) (step 39). According to the present invention, another structure may be employed in which the photometry is always performed during the continuation of the halfway depressing of the release switch (the switch SW₁ is switched on) and the shutter speed at the time of the release is always updated in accordance with the thus obtained photometry value.

Another method may be employed to determine that the subject point is the gazing point in accordance with the time (idle time) in which the gazing line is retained. That is, if the time in which the gazing line of a user is retained at a position for a certain length or longer, the above-described point is considered to be the gazing point.

According to this embodiment, the position of the focal point is obtained by using the nearest point and the farthest point. Information about all of the focusing points may be used. In this case, the position of the focal point may be obtained by a method in which the weighted mean of information about all of the positions of the focal points is calculated so as to set it as the position of the focal point and to determine the aperture value in such a manner that the nearest point and the farthest point are focused.

Fifth Embodiment

Figure 10A:
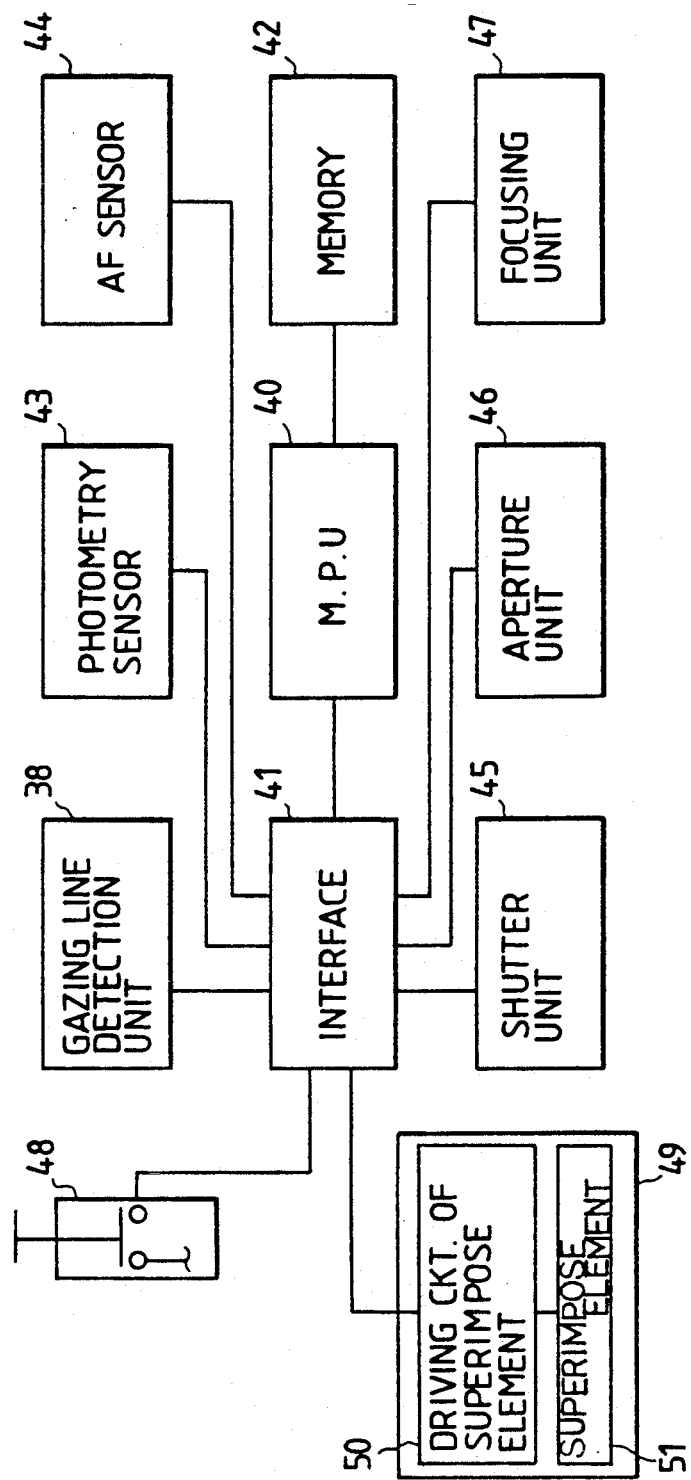

FIG. 10 is a block diagram which illustrates a fifth embodiment of the present invention. Referring to the drawing, reference numeral 48 represents an external input means through which the gazing point is inputted by a user. Reference numeral 50 represents a driving circuit of a superimpose element and 51 represents a superimpose element. A G.L.C. (Graded Liquid Crystal) is known to serve as the superimpose element and is, as shown in FIG. 8, disposed on the focusing plate. An M.P.U. 40 calculates the position of the gazing line of the user when an input is supplied from the external input means and a signal denoting the position is transmitted to the superimpose element driving circuit 50 via an interface 41. The superimpose element driving circuit 50 drives the element in accordance with the signal thus supplied so that the superimpose expression is made. Since the other portions are the same as those according to the fourth embodiment, the description is omitted here.

FIG. 10B is a flow chart which illustrates the operation of the fifth embodiment. The structure according to this embodiment is arranged in such a manner that the user instructs whether or not the subject point is the gazing point by using the external input means.

When the illustrated routine of the automatic depth mode is started due to the switching of, for example, the automatic-depth mode selection switch, the initialization for clearing the results of the calculations which have been previously made is performed (step 40). Then, the gazing line of the user is detected (step 41) so as to display this point in a superimpose manner in the finder (step 42). The user determines (step 43) depending upon the superimpose display whether or not the subject point is emphasized at the photographing operation, that is, whether or not the subject point is the gazing point which is used in the calculation for obtaining the constant at the time of performing the final position of the focal point control and the exposure control (step 43). Then, the user instructs the thus determined result through the external input means 48. If the fact that the subject point is the gazing point has been instructed through the external input means 48, information about the position of the focal point, information about the photometry or information about the gazing point (coordinate) at that point is stored (step 44). The above-described operation is continued until the release button is depressed halfway (step 45). However, because of the same reason as that in the fourth embodiment, the number of the gazing points which are stored in the memory is limited to some recent points. When the release switch is depressed halfway, the nearest point and the farthest point are, similarly to the fourth embodiment, acknowledged by using information about the position of the focal point stored in the memory. Also information about the focal distance of the lens is used so as to calculate the position of the focal point between the two points from which the width of the ideal depth can be obtained. Furthermore, the aperture value at which the above-described two points are included in the depth of field is calculated (step 47). Simultaneously, the lens is moved to the position of the focal point thus calculated. Then, by using all of the stored photometry values or at the point corresponding to the stored gazing point, the photometry is performed so that the exposure value at the time of the release is obtained. By using the value thus obtained and the aperture value, the shutter speed is set (step 48). When the release switch is depressed all the way (the switch SW₂ is switched on), a routine in which the release operation is performed in accordance with the thus obtained aperture value and the shutter speed is stored (step 49).

Also according to this embodiment, either the structure may be employed in which the calculated values (the position of the focal point, the aperture value and the shutter speed) are held (step 50) during the continuation of the halfway depressing of the release switch or the structure may be employed in which the shutter speed is updated.

According to the fourth and the fifth embodiments, the processing in which the farthest point and the nearest point are calculated is performed after the release switch has been depressed halfway (the switch SW₁ has been switched on).

Sixth and seventh embodiments in which the farthest point and the nearest point are obtained in a loop until the release switch is depressed halfway will be described.

Sixth Embodiment

Figure 11:
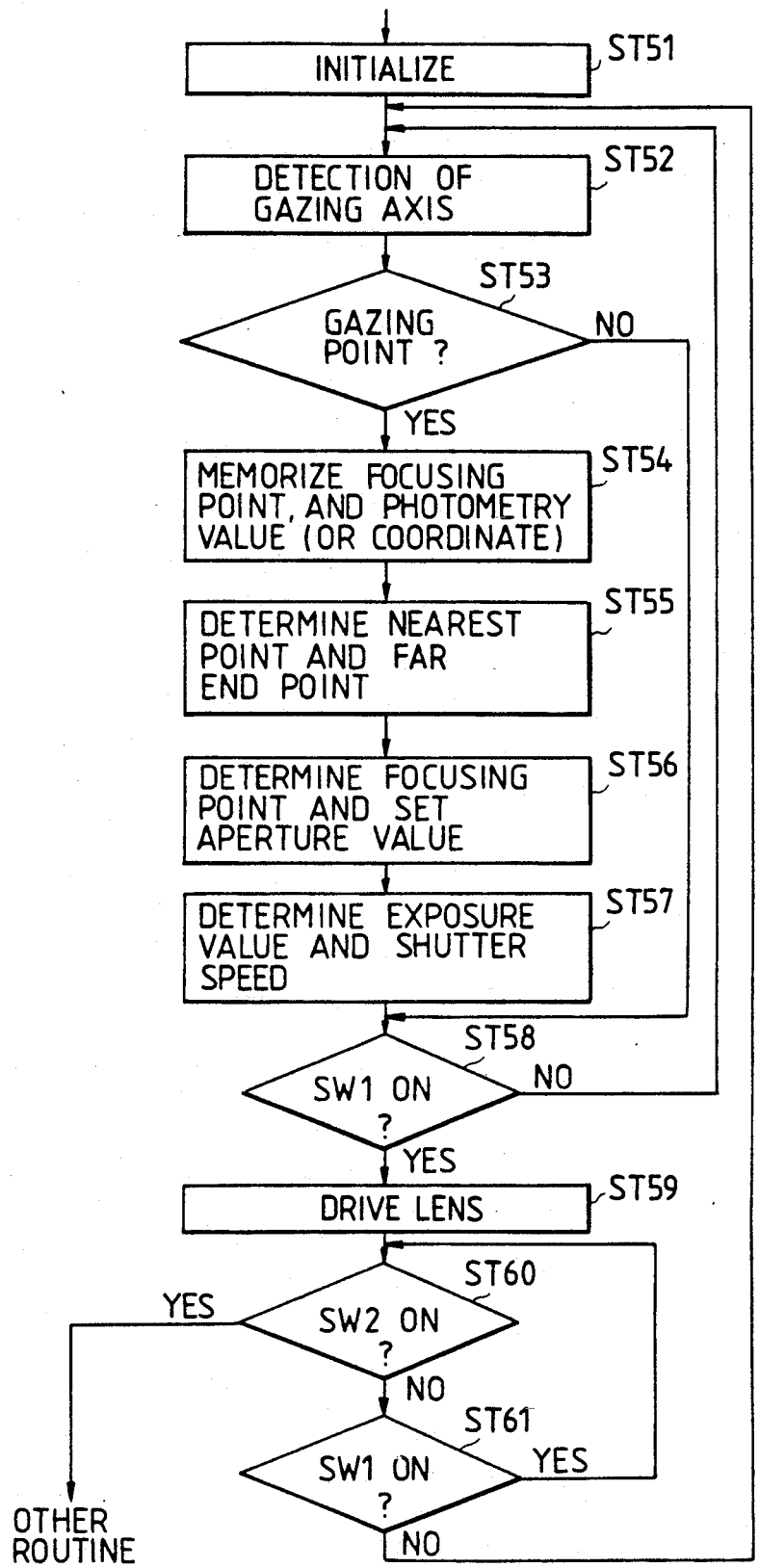
FIGS. 11 and 12 are flow charts for sixth and seventh embodiments of the present invention.

FIG. 11 is a flow chart for the sixth embodiment.

Similarly to the above-described embodiments, when the automatic depth mode is started, the initialization is first performed (step 51) so that the results of the calculations which have been previously made are cleared. Then, the gazing line of the user is detected (step 52). Then, a determination is made whether or not the subject point is the gazing point (step 53). If it has been determined that the subject point is the gazing point, information about the focusing point, information about the photometry value or information about the gazing point (coordinate) at that point is stored (step 54). The determination of the gazing point may be made by, for example, a method employed in the fourth embodiment in which the idle time of the gazing line is used. First, the nearest point and the farthest point are obtained by using information about the position of the focal point thus stored (step 55). Also information about the focal distance of the lens is used so as to calculate the position of the focal point between the above-described two points from which the width of the ideal depth can be obtained. Furthermore, the aperture value at which the above-described two points are included in the depth of field is calculated (step 56). Then, by using all of the stored photometry values or at the point corresponding to the stored gazing point, the photometry is performed so that the exposure value at the time of the release is obtained and the shutter speed is obtained (step 57). The above-described operation is continued until the release switch is depressed by half (step 58) so that the nearest point and the farthest point are obtained for the purpose of calculating the position of the focal point, the aperture value and the shutter speed whenever a novel gazing point is extracted. Because of the same reason so that in the fourth and the fifth embodiments, the number of the gazing points for use in obtaining the position of the focal point, the aperture value and the shutter speed is limited to the points within a predetermined time immediately before the halfway depressing of the release switch. The above-described limitation can be realized by a structure comprising memories for storing information about a plurality of gazing points so that, whenever a gazing point is extracted, information bout that point is stored and, when all of the memories store information, information about the longest stored gazing point is updated by information about the latest gazing point. When the release switch is depressed halfway, the lens is moved to the position of the focal point which has been calculated at that time (step 59). When the release switch is depressed all the way (when the switch SW$_2$ is switched on), a routine in which the release operation is performed in accordance with the aperture value and the shutter speed which have been calculated is started. The contents of the memory are maintained in the state where the release switch is depressed halfway (step 61).

Seventh Embodiment

Figure 12:
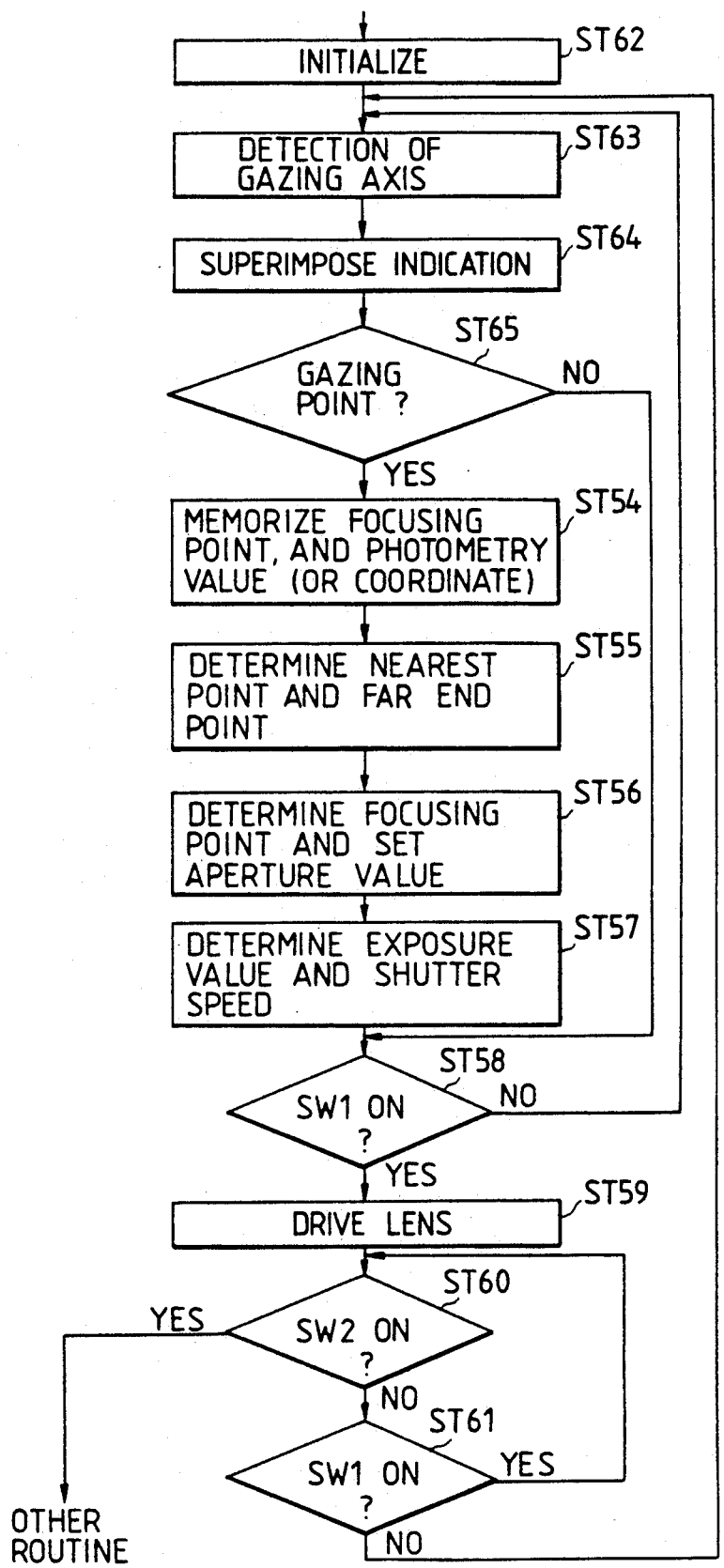
Figure 13A:
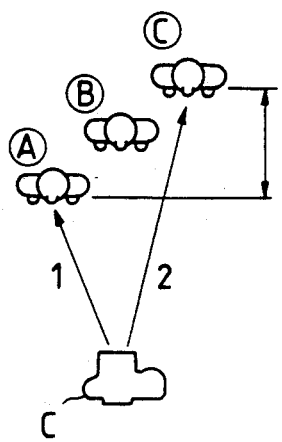
FIGS. 13A and 13B illustrate the photographing operation in accordance with a conventional depth mode.
Figure 13B:
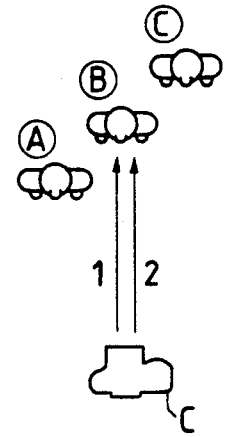

FIG. 12 is a flow chart for a seventh embodiment.

This embodiment is arranged similarly to the sixth embodiment except for a structure in which the initialization is performed (step 62) and the gazing line of a user is detected (step 63) before that point is displayed in the finder in a superimpose manner (step 64). Furthermore, the user determines whether or not the point thus displayed is made to be the gazing point (step 65) so as to instruct the result of the determination through an external means (superimpose display).

According to the flow charts for the sixth and the seventh embodiments shown in FIGS. 11 and 12, the calculated value is arranged to be held during the halfway depressing of the release switch. Each of the sixth and the seventh embodiments may employ another structure arranged in such a manner that the calculated value is not held and the photometry is always performed during the continuation of the halfway depressing of the release switch so as to always update the shutter speed at the time of the release.

When the position of the focal point at the time of the photographing operation is desired to be obtained by using information about the position of the focal point for all of the gazing points according to the fifth, the sixth and the seventh embodiments, it may be obtained by a structure arranged in such a manner that the weighted mean of information about all of the positions of the focal points is calculated so as to set that point as the position of the focal point and to set the aperture value with which the nearest point and the farthest point can be focused.

As described above, according to the fourth to the seventh embodiments, the automatic depth mode is realized in which the position of the focal point, the aperture value and the shutter speed at the time of the photographing operation are set by using both information about the position of the focal point and information about the photometry at the gazing point obtained by detecting the gazing line of the user.

Therefore, a range desired by a user can be focused without too complicated an operation. Furthermore, since the operation and the calculation can be complicated during the framing work, the lens can be quickly moved in response to the shutter release operation. Therefore, the depth mode exhibiting good handling facility can be realized.

Figure 14A:
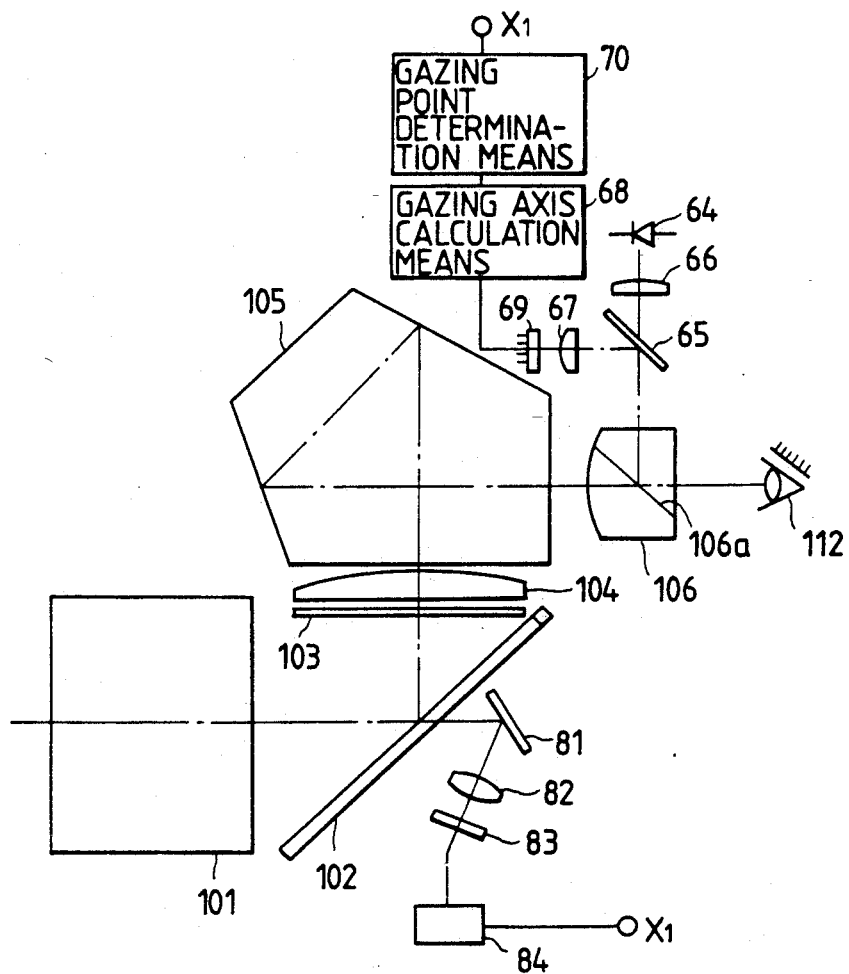
FIG. 14A is a schematic view which illustrates an essential portion of an eighth embodiment of the present invention in which the present invention is applied to a single-lens reflex camera.
Figure 14B:
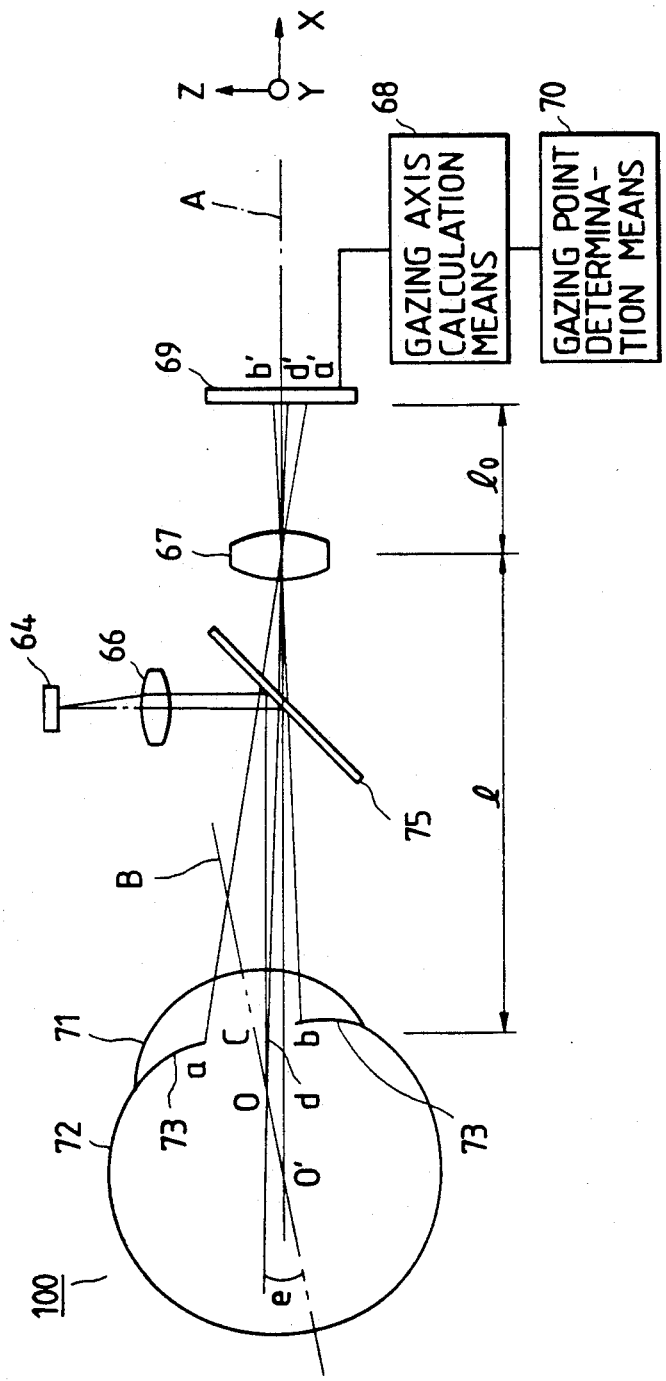
FIG. 14B illustrates the principle of detection of the gazing direction of the eyeball in the gazing point detection device shown in FIG. 14A.

FIG. 14A is a schematic view which illustrates an essential portion of a single-lens reflex camera according to an eighth embodiment of the present invention. FIG. 14B is a schematic view which illustrates an essential portion of a gazing point detection device shown in FIG. 14A for the purpose of describing the principle of detecting the gazing direction of the eyeball of the observer for obtaining the gazing point.

The exposure control device shown in FIG. 14A will be schematically described.

According to this embodiment, the image of the subject is formed on a focusing plate (observing plane) 103 by an imaging lens 101 via a jumping mirror 102. The image of the subject formed in the form of an erected image on the focusing plate 103 is observed through an ocular lens 106 having a dichroic mirror surface 106a via a penta-roof prism 105. According to this embodiment, each of the elements 103, 104, 105 and 106 constitute a component of an observing system.

In general, the observer (the user) gazing the finder field of a single-lens reflex camera receives and observes light of a subject (image) formed on the focusing plate 103 reflected by the jumping mirror 102 after the light of the subject has passed through the imaging lens 101, the light of the subject being received via the penta-roof prism 105 and the ocular lens 106. At this time, the observer turns the eyeball thereof so as to gaze at the subject in the finder field.

An illuminating means (comprising a light source 64 and an illuminating lens 66) is disposed in front of the ocular lens 106 so that the eyeball 112 of the observer is illuminated.

Infrared rays reflected by the cornea and the iris of the eyeball 112 are made incident upon the ocular lens 106 and are as well reflected by the dichroic mirror portion 106a of the ocular lens 106 so that the image is formed on an image sensor 69 via a half mirror 65 and a light receiving lens 7. The dichroic mirror portion 106a of the ocular lens 106 is manufactured by putting two perpendicular prisms adjacent to each other, each perpendicular prism having a dielectric multi-layered film applied thereon. The dielectric multi-layered film allows the visible radiation to pass through and the infrared rays to be reflected. The singular point of the image of each of the cornea and the iris formed due to the reflection on the eyeball and formed on the image sensor 69 is detected so that the gazing line is detected by a gazing line calculating means 68 in a manner to be described later. In accordance with the result of the above-described detection, a gazing point extracting means 70 detects the gazing point on the focusing plate 103 which is the gazing point desired by the observer. The image sensor 9 and the gazing line calculating means 68 each constitute a component of a gazing line detection means.

Figure 14C:
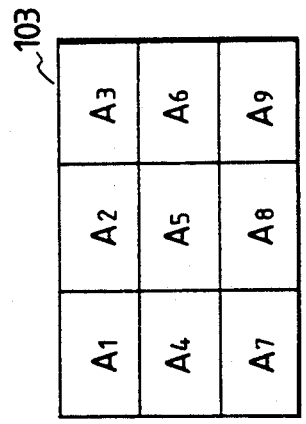
FIG. 14C illustrates the observation range of an observing system according to the present invention.

One or more predetermined regions of regions $A_1$ to $A_9$ of the observing surface (focusing plate 103) corresponding to the gazing point extracted by the gazing point extracting means 70 and shown in FIG. 14C are subjected to the photometry by a photometry means 83 via a convergent lens 82. Then, an exposure control means 84 obtains information about the exposure by using the photometry value supplied from the photometry means 83.

Referring to FIG. 14B, a method of detecting the gazing direction of the eyeball, used when the gazing point is obtained, will be described.

Referring to the drawing, reference numeral 100 represents the eyeball of the user (the observer) and 71 represents the cornea of the eyeball 100 of the observer. Reference numeral 72 represents the sclera and 73 represents the iris. Symbol O' represents the center of rotation, 0 represents the curvature center of the cornea 71 and a and b represent the ends of the iris. Symbol d represents the position at which the image, reflected by the cornea due to the light source 64, is generated in a manner to be described later. Reference numeral 64 represents a light emitting diode or the like which emits infrared rays which are insensible for the observer. The light source 64 is disposed in the vicinity of the focal plane of the illuminating lens 66. The illuminating lens 66 illuminates the surface of the cornea 71 with the parallel beams supplied from the light source 64. The light source 64 and the illuminating lens 66 each constitute a component of an illuminating means.

Reference numeral 67 represents a light receiving lens which forms the position d at which the image reflected by the cornea is generated and the ends a and b of the iris on the surface of the image sensor (photoelectric conversion device) 69, the position d and the ends a and b being formed in the vicinity of the cornea 71. The light receiving lens 67 and the image sensor 69 constitute a component of a detection means.

Reference numeral 68 represents a gazing line calculating means for obtaining the gazing line in response to an output signal from the image sensor 9. Reference numeral 70 represents a gazing point extracting means for extracting the gazing direction desired by the observer, that is, the gazing point in the observing field (a region on the focusing plate 103 shown in FIG. 14A) in accordance with information about the gazing direction transmitted successively from the gazing line calculating means 68 by a method to be described later.

Therefore, a variety of photographing operations such as the evaluation photometry and the multi-point photometry can be controlled in accordance with the desire of the observer in accordance with the output signal from the gazing point extracting means 70.

Symbol A represents the optical axis of the light receiving lens 67 which coincides with axis X shown in FIG. 14B and B represents the optical axis of the eyeball which makes angle $\theta$ with respect to the axis X.

Then, the optical action of this embodiment will be described below.

Infrared rays emitted from the light source 64 pass through the illuminating lens 66 so that they are made to be parallel beams which illuminate the cornea 71 of the eyeball 100. The infrared rays, which have passed through the cornea 71, illuminate the iris 73.

The position d, at which the image reflected by the cornea is generated and determined due to the beam reflected by the surface of the cornea 71 of the infrared rays for illuminating, the eyeball, is imaged at point d' of the image sensor 69 via the light receiving lens 67.

Infrared rays diffused and reflected by the surface of the iris 73 are introduced onto the image sensor 69 via the light receiving lens 67 so as to form the image of the iris.

Figure 15:
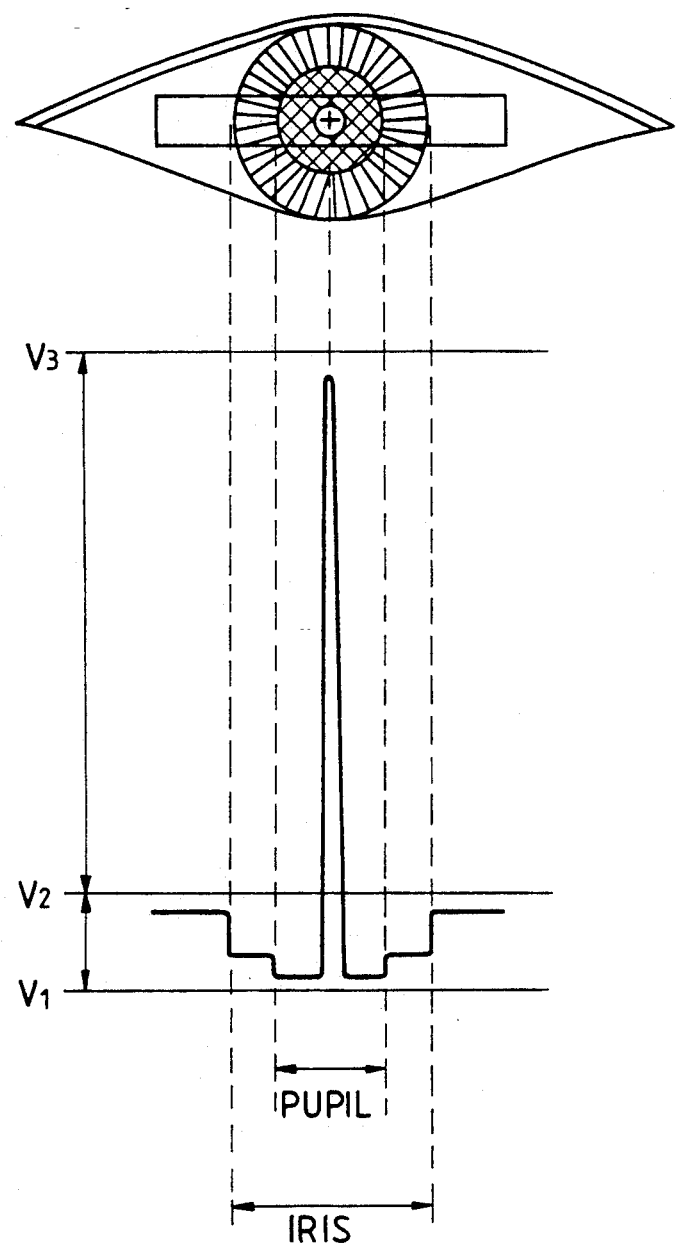
FIG. 15 illustrates a horizontal scanning output signal from an image sensor corresponding to each of the positions of the eyeball according to the present invention.

FIG. 15 is a schematic view which illustrates the eyeball and a horizontal scanning output signal transmitted from the image sensor which corresponds to each position of the eyeball when the images reflected by the singular points of the eyeball are formed on the image sensor 69 and the central portion of the eyeball is horizontally scanned.

The gazing line calculating means 68 calculates the rotational angle $\theta$ of the eyeball in accordance with the position of the image spot reflected by the cornea by the following equation:

$$\bar{\beta} \cdot OC \cdot \sin\theta \simeq \frac{Za' + Zb'}{2} - Zd'$$

According to this embodiment, the gazing axis of the eyeball is obtained from the rotational angle $\theta$ at this time so that the gazing line of the observer is detected. In accordance with the gazing line thus obtained, the gazing point observed by the observer, that is, a certain region of the regions $A_1$ to $A_9$ on the observing surface (the focusing plate 103) as shown in FIG. 14C is obtained.

Figure 16:
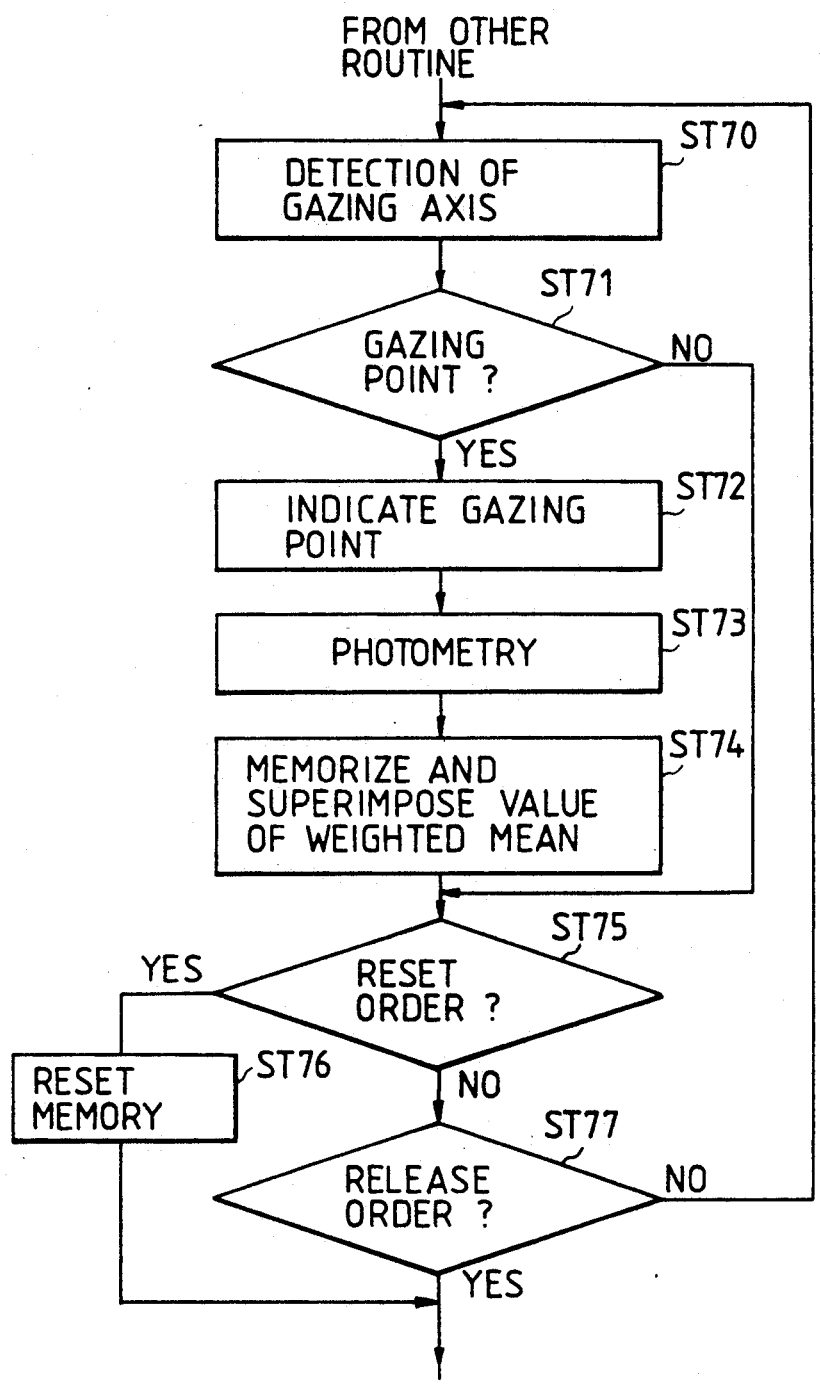
FIGS. 16 and 19 are flow charts for eighth and ninth embodiments of the present invention.

FIG. 16 is a flow chart for this embodiment. According to this embodiment, when a multi-spot photometry mode is started, the microcomputer included in the camera calculates the gazing line of the user in response to a signal supplied from the gazing line detection device, that is, the point on the focusing plate 103 observed by the user (step 70). Then, it is determined whether or not the subject point is the gazing point (in this case, it is the point determined by the user to be the photometry point for the multi-spot photometry) (step 71). If it has been determined that the subject point is the gazing point, that point is displayed on the focusing plate 103 in a superimpose manner (step 72) so that the fact that subject point has been recognized as the gazing point is noticed by the user. The above-described action is a recognition action for a user, the provision of which is determined depending upon the cost of the product or the needs of the user or the manner of the use. Therefore, the above-described recognition may be realized by a buzzer sound or it may be omitted from the structure. The photometry value at the gazing point is obtained (step 73), the value being then stored in the memory as the first weighted average value. If necessary, the weighted average value is displayed in the finder or the like (step 74). If necessary, the photometry value at the gazing point is also stored in the memory.

When the reset of the multi-spot photometry is instructed by a reset switch or the like (step 75), the value stored in the memory is reset regardless of the result of the determination whether or not the subject point is the gazing point (step 76) so that another routine is started. When the release operation has been instructed by the release switch (step 77), the release operation routine is started.

In other cases, the similar operation is repeated. That is, the gazing position of the user is obtained and it is determined whether or not the subject point is the gazing point. If it has been determined that the subject point is the gazing point, that point is displayed in a superimpose manner if necessary so that it is confirmed by the user. Then, the photometry value at that point is obtained so as to calculate a novel weighted-average value from the above-described value and the weighted average value which have been obtained previously. The novel weighted average value is stored in the memory and is displayed in the finder if necessary.

Also the photometry value at the gazing point is stored in the memory if necessary. When the resetting or the release is instructed, the respective routine is started similarly to the above-described case and the same process is repeated after this. However, the number of the repetitions is restricted by the capacity of the memory. In order to correspond to the case where the number of the repetitions exceeds a predetermined number of times, a structure may be employed in which the weighted average value obtained before the time at which the number of the repetitions exceeds the predetermined times is maintained as it is. As an alternative to this, a structure may be employed in which the weighted average value of the photometry values for the latest repetition times is obtained so as to be stored.

Figure 17:
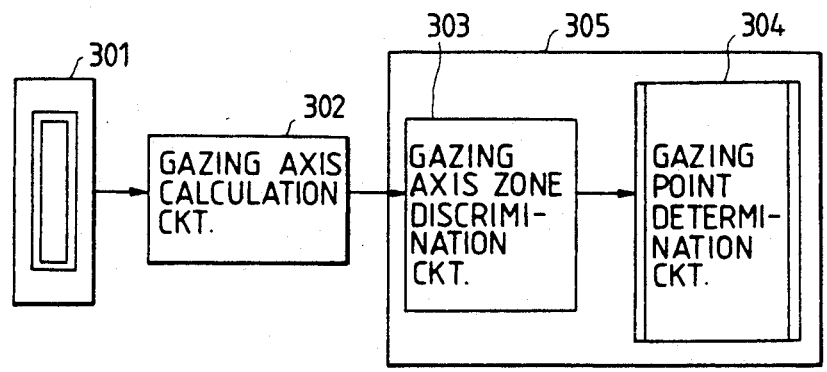
FIG. 17 is a block diagram which illustrates an electric circuit for detecting the gazing point according to the present invention.

FIG. 17 is a block diagram which illustrates an electric circuit for use in the gazing point detection means according to the present invention.

Referring to the drawing, reference numeral 301 represents a photoelectric conversion device (image sensor) which is an element of a detection means for detecting the image reflected by the eyeball. Reference numeral 302 represents a gazing line calculating circuit and 303 represents a gazing line zone determination circuit. The gazing line zone determination circuit 303 detects the zone (region) on, for example, the focusing plate in the observed field gazed by the user. The gazing line zone determination circuit 303 performs the determination in accordance with the rotational angle $\theta$ transmitted from the gazing line calculating circuit 302. Reference numeral 304 represents a gazing point calculating circuit. The gazing line zone determination circuit 303 and the gazing point calculating circuit 304 constitute a gazing point extracting circuit 305.

FIG. 14C illustrates the range of the observation according to this embodiment, for example, the finder frame of the camera. The finder frame is divided into 9 zones $A_1$ to $A_9$ and photometry elements are disposed to the respective zones so as to perform the division photometry.

An output signal from the gazing line calculating circuit 302 is determined by the zone determination circuit 303 into, for example, any of the zones $A_1$ to $A_9$ so as to be supplied to the gazing point calculating circuit 304. Assuming that the zone $A_5$ is extracted from the gazing point calculating circuit 304 as the gazing direction of the user, a photometry is performed in such a manner that the zone $A_5$ is weighted. As a result, the photograph can be taken under the conditions which meet the desire of the observer.

Figure 18:
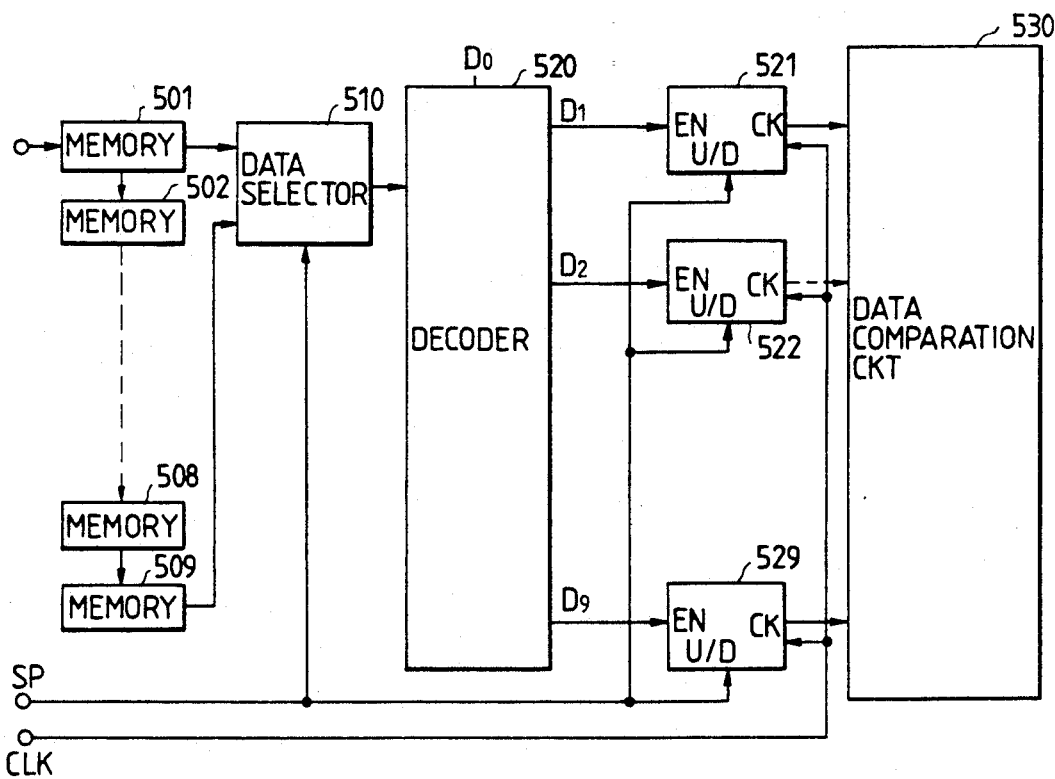
FIG. 18 is a block diagram which illustrates a gazing point detection circuit according to the present invention.

FIG. 18 is a block diagram which illustrates an example of the gazing point extracting circuit according to this embodiment.

Referring to the drawing, reference numerals 501, 502, ..., 508 and 509 represent sequential transfer memories for successively receiving transferring data of code information about the zone determined by the zone determination circuit 303. Reference numeral 510 represents a data selector for switching data in the memories 501 and 509 in response to a pulse supplied from a terminal SP. Reference numeral 520 represents decoder for decoding data transmitted from the data selector 510 so that any of the outputs from terminals $D_0$ to $D_9$ is selected. Reference numerals 521 to 529 represent updown counters for counting code data corresponding to, for example, the zones $A_1$ to $A_9$ shown in FIG. 14C. The fact whether or not the counting is performed is controlled by signals from the terminals $D_0$ to $D_9$, while the increment and decrement of the counting is controlled by the terminal SP. Symbol CLK represents a count clock input terminal.

Reference numeral 530 represents a data comparison circuit for subjecting data stored in the updown counters 521 to 529 to a comparison.

According to this embodiment, the number of times the observer gazed at the zone of an observed area, which is divided into a plurality of sections, during a predetermined time, that is, the frequency, is detected.

Referring to FIG. 18, data before the predetermined time is deleted and novel data is added so as to be updated. As a result, the frequency is always transmitted from the latest data for a predetermined time.

The operation of this embodiment will be described. When power is supplied to the system, a power-up clear is instructed so that the overall circuit is reset to the initial stage. At this time, also the memories 501 to 509 are made to be, for example, zero since they have no data therein.

Then, a data updating pulse is added to the terminal SP so that data in the memory 509 is supplied to the decoder 520 via the data selector 510 during the period in which the terminal SP is maintained at a high level. When input data is zero, the terminal $D_0$ is selected, causing the terminal SP to be raised to a high level, while the terminals $D_1$ to $D_9$ are maintained at a low level. The counting of the counters 521 to 529 is prohibited. That is, the counters 521 to 529 are not operated during the time period in which there is no data in the memory 509.

Then, data items in the memories 501 to 509 are successively and downwardly shifted and data in the memory 509 is deleted.

Then, information transmitted via the gazing line calculating circuit 302 and the zone determination circuit 303 is supplied to the memory 501. When the terminal SP has been brought to a low level and the memory 501 is selected by the data selector 510, data in the memory 501 is supplied to the decoder 520. As a result, the output terminal corresponding to the supplied data, for example, the terminal $D_2$ is brought to a high level, causing the counter 522 to be brought into a state in which the counter 522 is able to perform the counting.

Since the level of the terminal SP is low at this time, the counter is in an upcount mode in which an updating clock is added by one from the clock terminal CLK so that the count is increased.

Then, an updating pulse is added to the terminal SP so that the contents of the memory 509 are deleted from the counters 521 to 529. That is, in the case where there is data in the memory 509, data in the memory 509 is supplied to the decoder 520 via the data selector 510. As a result, the corresponding output terminal, for example, the terminal $D_2$ is selected and its level is raised to a high level. This leads to a fact that the counter 522 is brought into a state where it can perform the counting. Since the terminal SP is at a high level at this time, the counters 521 to 529 are brought into a downcount mode. Therefore, when the updating clock is added by one from the clock terminal CLK, the counter 522 is brought into a downcount mode in which the data in the memory 509 is deleted.

The above-described operations are successively repeated so that the latest frequency data in a predetermined time is counted by the corresponding counters 521 to 529. The above-described "predetermined time" serving as the reference for counting the frequency can be easily set by changing the number of the memories 501 to 509.

The latest frequency data counted by the counters 521 to 529 is subjected to a comparison by the data comparison circuit 530 corresponding to the desire so that the desired data is transmitted.

Figure 19:
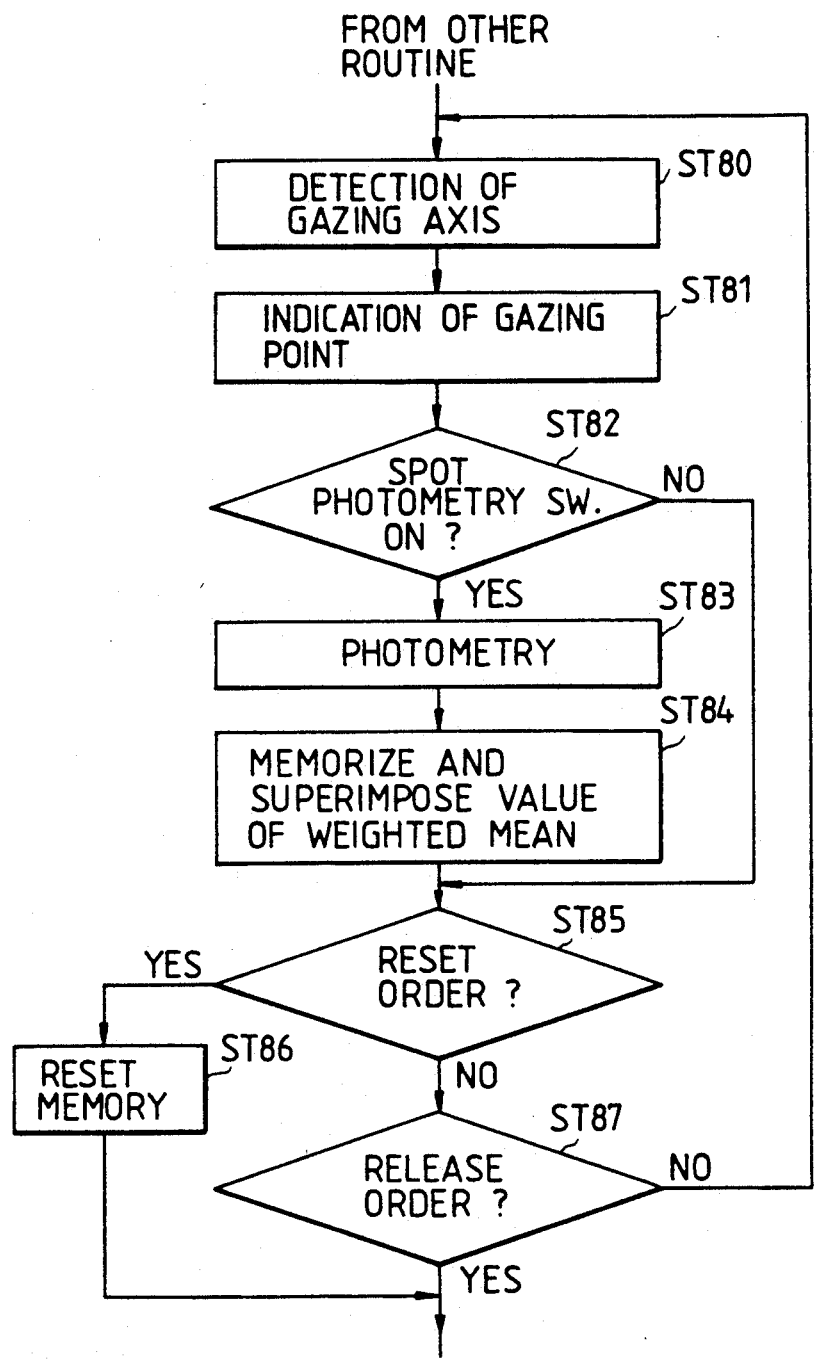
Figure 20:
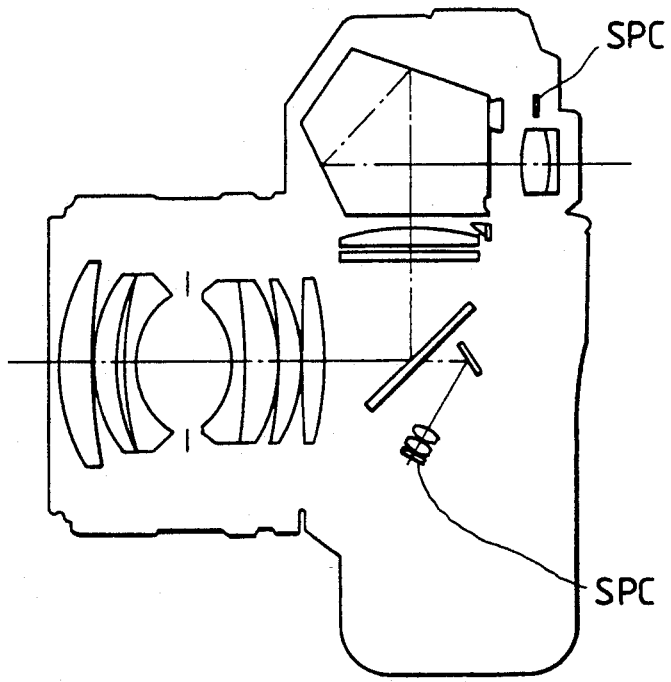
FIG. 20 is a schematic view which illustrates a single-lens reflex camera having a conventional exposure control device.

FIG. 19 is a flow chart for a ninth embodiment of the present invention.

According to this embodiment, when the multi-spot photometry mode is started, the microcomputer included in the camera calculates, similarly to the eighth embodiment, the gazing line of the user by using a signal supplied from the gazing line detection device (step 80). If necessary, the subject position is displayed on the focusing plate in a superimpose manner (step 81) so that a user confirms the gazing position recognized by the camera. The fact whether or not the above-described confirmation structure is provided is, similarly to the eighth embodiment, determined depending upon the cost of the product, the needs of the user and the way of the usage. When the spot photometry button is depressed at this time (step 82), the photometry value at the gazing point is obtained (step 83). As a result, the photometry value thus obtained is stored in the memory as the first weighted average value. If necessary, the above-described photometry value is displayed in the finder or the like. Also if necessary, the photometry value at the gazing point is stored in the memory (step 84). When the resetting is not instructed or when the release is instructed (steps 85 and 87), the corresponding routine is started regardless of the fact that the spot photometry button has been depressed. In the other cases, the same process is repeated. If there is an instruction of the resetting, the contents of the memory are reset (step 86).

That is, the gazing position of the user is calculated and that point thus calculated is displayed in a superimpose manner if necessary. When the spot photometry button is depressed at this time, the photometry value at that point is obtained and a novel weighted average value is calculated from the above-described photometry value and the weighted average value obtained previously so as to be stored in the memory. If necessary, it is displayed in the finder or the like. Furthermore, the photometry value at the gazing point is also stored in the memory if necessary. Similarly to the above-made description, when the resetting or the release is instructed, the corresponding routine is started. In the other case, the same process is repeated. The number of the above-described repetition is, similarly to the eighth embodiment, limited.

According to the eighth and the ninth embodiments of the present invention, the gazing line of the eyeball of the observer (user) observing the surface to be observed is detected so as to obtain the gazing point of the observer on the surface to be observed from the gazing line thus detected. Then, a plurality of photometry values corresponding to the above-described gazing point are obtained so as to be used for obtaining the final information about exposure for performing the exposure control. Therefore, an exposure control device can be realized which exhibits an excellent handling facility with which satisfactory multi-spot photometry can be performed in any photographing conditions without a necessity of unduly complicated handling and which uses a gazing line signal.

Although the invention has been described in its preferred form with a certain degree of particularity, it is understood that the present disclosure of the preferred form may be changed in the details of construction and the combination and arrangement of parts without departing from the spirit and the scope of the invention as hereinafter claimed.

What is claimed is:

1. A camera, comprising:
   (a) gazing line position detection means for detecting one or more gazing lines of a user gazing a finder, said detecting means determining the gazing line from information of a plurality of visual lines;
   (b) photometry means for performing photometry of an object and
   (c) control means for changing a photometry value obtained by said photometry means in accordance with information about said gazing line obtained by said detection means, said control means changing, when a plurality of gazing lines are detected by said detection means, said photometry value in response to an information of said plural gazing lines.

2. A camera according to claim 1, wherein said control means selects a photometry area in accordance with said information about said gazing line or said plurality of gazing lines.

3. A camera according to claim 1, wherein said control means changes said photometry value obtained by said photometry means in accordance with said information about said gazing line or said plurality of gazing lines in which the frequency of the distribution of said visual lines are weighted.

4. A camera according to claim 1, wherein said control means changes said photometry value obtained by said photometry means in accordance with said information about said gazing line or said plurality of gazing lines in which an idling time at said visual lines are weighted.

5. A camera according to claim 1, wherein said control means changes said photometry value obtained by said photometry means in accordance with said information about said gazing line or said plurality of gazing lines in which the number of idling times at said visual lines are weighted.

6. A camera according to claim 1, wherein said control means changes said photometry value obtained by said photometry means in accordance with said information about said gazing line or said plurality of gazing lines immediately before a shutter release operation.

7. A camera according to claim 1, wherein
said photometry means is capable of subjecting a surface to be photographed to photometry by dividing said surface into a plurality of regions, and said control means changes the weight of the photometry value for each of said plurality of regions obtained by said photometry means in accordance with said information about said gazing line.

8. A camera, comprising:

(a) gazing line position detection means for detecting one or more gazing lines of a user gazing a finder, said detection means determining the gazing line from information of a plurality of visual lines; and (b) control means for determining the position of a focal point so as to focus an object in accordance with information about said gazing line obtained by said detection means, said control means determining, when said detection means detects a plurality of gazing lines, the position of said focal point in response to an information of said plural gazing lines.

9. A camera according to claim 8, wherein, when said plurality of gazing lines are obtained by said detection means, said control means determines said position of said focal point by using nearest focus information and farthest focus information at said gazing lines.

10. A camera according to claim 8 further comprising means for determining an exposure value after said position of said focal point has been determined by said control means.

11. A camera according to claim 9, wherein, when said plurality of gazing lines are obtained by said detection means, said control means detects photometry information and focus information about an object in accordance with said gazing lines and determines said position of said focal point so as to focus an object portion in accordance with said focus information.

12. A camera according to claim 11, wherein said control means also determines an aperture value.

13. A camera according to claim 9, further comprising display means for displaying a position of said gazing line or positions of said plurality of gazing lines obtained by said detection means.

14. A camera according to claim 11, further comprising display means for displaying a position of said gazing line or positions of said plurality of gazing lines obtained by said detection means.

15. A camera according to claim 9, further comprising drive means for driving a lens in accordance with said position of said focal point determined by said control means.

16. A camera according to claim 11, further comprising drive means for driving a lens in accordance with said position of said focal point determined by said control means.

17. A camera, comprising:
(a) detection means for detecting one or more gazing points in accordance with one or more gazing lines of a user gazing a finder;
(b) photometry means capable of dividing a surface to be photographed into a plurality of regions and subjecting each of said regions to photometry; and
(c) control means for performing photometry of said region in which said gazing point obtained by said detection means is positioned and obtaining information about exposure, said control means, when said detection means detects a plurality of gazing points, performing the photometry for regions including said plurality of gazing points.

18. A camera according to claim 17, wherein, when said plurality of gazing points are obtained by said detection means, said control means calculates the weighted average value of information about photometry about a plurality of regions in which said gazing points are positioned so as to use said gazing points as information about exposure.

19. A camera according to claim 17, further comprising display means for displaying said position of said gazing point.

20. A camera according to claim 17, further comprising switch means for switching the control system of said control means, wherein said switch means is switched between a mode in which said information about exposure is obtained in accordance with said gazing point and a mode in which said information about exposure is obtained regardless of said gazing point.

21. A camera according to claim 18 further comprising switch means for switching the control system of said control means, wherein said switch means is switched between a mode in which said information about exposure is obtained in accordance with said gazing point and a mode in which said information about exposure is obtained regardless of said gazing point.

22. A camera comprising:
(a) gazing line position detection means for detecting one or more gazing lines of a user gazing a finder, said detection means determining the gazing line from information of a plurality of visual lines;
(b) photometry means for performing photometry of an object; and
(c) control means for changing a photometry area for said photometry means in accordance with information about the gazing line obtained by said detection means, said control means, when said detection means detects a plurality of gazing lines, changing a plurality of photometry areas for photometry in response to an information of said plurality of gazing lines.

23. A camera according to claim 22, wherein said information about said gazing line or said plurality of gazing lines for use in said control means includes information about one or more gazing points.

24. A camera according to claim 23, wherein said control means changes said photometry area or said photometry areas for said photometry means in accordance with said information about said gazing point or said plurality of gazing points in which said frequency of the distribution of said gazing point is weighted.

25. A camera according to claim 23, wherein said control means changes said photometry area or said photometry areas for said photometry means in accordance with said information about said gazing point or said plurality of gazing points in which said idling time at said gazing point is weighted.

26. A camera according to claim 24, wherein said control means changes said photometry area or said photometry areas for said photometry means in accordance with said information about said gazing point or said plurality of gazing points in which said time of idling at said gazing point is weighted.

* * * * *